(12) United States Patent
Force et al.

(10) Patent No.: US 9,039,333 B2
(45) Date of Patent: May 26, 2015

(54) DISCHARGE SYSTEM TO REMOVE SOLIDS FROM A VESSEL

(75) Inventors: Randall L. Force, Charleston, WV (US); Robert G. Aronson, Winfield, WV (US); Mark W. Blood, Hurricane, WV (US); Gerardo Corona, Houston, TX (US); Dung P. Le, Sugar Land, TX (US); W. Scott Hamilton, S. Charleston, WV (US); Thomas A. Maliszewski, Charleston, WV (US); William K. Lutz, Ripley, WV (US)

(73) Assignee: Univation Technologies, LLC, Houston, TX (US)

( * ) Notice: Subject to any disclaimer, the term of this patent is extended or adjusted under 35 U.S.C. 154(b) by 972 days.

(21) Appl. No.: 12/444,488

(22) PCT Filed: Sep. 10, 2007

(86) PCT No.: PCT/US2007/019650
§ 371 (c)(1),
(2), (4) Date: Jan. 14, 2010

(87) PCT Pub. No.: WO2008/045173
PCT Pub. Date: Apr. 17, 2008

(65) Prior Publication Data
US 2010/0143050 A1  Jun. 10, 2010

Related U.S. Application Data

(60) Provisional application No. 60/850,552, filed on Oct. 10, 2006.

(51) Int. Cl.
*B65G 53/56* (2006.01)
*B01J 8/00* (2006.01)
(Continued)

(52) U.S. Cl.
CPC ............... *B01J 8/003* (2013.01); *B65G 53/36* (2013.01); *B65G 53/56* (2013.01); *B01J 8/1809* (2013.01); *B01J 2208/00761* (2013.01)

(58) Field of Classification Search
USPC ......... 406/117, 118, 120, 122–127, 146, 155, 406/156, 168, 169, 170, 181, 183
See application file for complete search history.

(56) References Cited

U.S. PATENT DOCUMENTS 3,167,421 A  *  1/1965  Pfeiffer et al. .................. 75/330
3,434,968 A      3/1969  Lowe ............................ 210/705
(Continued)

FOREIGN PATENT DOCUMENTS

EP  0381364  8/1990
EP  0250169  9/1991
(Continued)

*Primary Examiner* — William R Harp
(74) *Attorney, Agent, or Firm* — Kristina Leavitt

(57) ABSTRACT

A discharge system for removing a solid/gas mixture from a fluidized bed pressure vessel is provided. The system includes a fluidized bed pressure vessel, settling vessels, discharge lines, primary discharge valves, vent lines, primary vent valves, crosstie lines, crosstie valves, and primary exit valves wherein the system is absent a transfer tank, and absent a filter element. The method provides for transferring a solid/gas mixture via a discharge line from the pressure vessel to a settling vessel, wherein gas is separated from the mixture, and the gas is transferred to at least one other settling vessel via a crosstie line. After the solids are transferred out of the settling vessel, the empty vessel then receives gas from other settling vessels in the system.

25 Claims, 9 Drawing Sheets

(51) Int. Cl.
*B01J 8/18* (2006.01)
*B65G 53/36* (2006.01)

(56) References Cited

U.S. PATENT DOCUMENTS

| | | | | |
|---|---|---|---|---|
| 3,720,351 A * | 3/1973 | Coulter et al. | | 222/1 |
| 3,994,701 A * | 11/1976 | Schweimanns | | 406/175 |
| 4,003,712 A | 1/1977 | Miller | | 422/62 |
| 4,018,671 A * | 4/1977 | Andon et al. | | 208/152 |
| 4,027,920 A * | 6/1977 | Wennerstrom | | 406/181 |
| 4,380,960 A | 4/1983 | Dickinson | | 110/347 |
| 4,621,952 A | 11/1986 | Aronson | | 406/138 |
| 4,838,898 A * | 6/1989 | Mifflin et al. | | 48/210 |
| 4,858,144 A | 8/1989 | Marsaly et al. | | |
| 5,116,940 A | 5/1992 | Eisinger | | 528/483 |
| 5,284,187 A * | 2/1994 | Schmit | | 141/1 |
| 5,348,573 A | 9/1994 | Tomassian et al. | | 96/151 |
| 5,443,806 A | 8/1995 | Isaksson et al. | | |
| 5,657,704 A * | 8/1997 | Schueler | | 110/106 |
| 5,722,801 A * | 3/1998 | Mahoney, Jr. | | 406/24 |
| 5,929,180 A | 7/1999 | Chinh | | 526/68 |
| 6,255,411 B1 | 7/2001 | Hartley et al. | | 526/88 |
| 6,472,483 B1 | 10/2002 | Goode et al. | | 526/88 |
| 6,498,220 B2 | 12/2002 | Hartley et al. | | 526/88 |
| 7,540,891 B2 * | 6/2009 | Van Den Born et al. | | 48/24 |
| 7,854,793 B2 * | 12/2010 | Rarig et al. | | 96/116 |
| 2001/0034422 A1 | 10/2001 | Hartley et al. | | 526/88 |
| 2002/0029691 A1 | 3/2002 | McCombs et al. | | 95/96 |
| 2003/0213745 A1 | 11/2003 | Haerther et al. | | 210/602 |
| 2004/0166033 A1 | 8/2004 | Miller et al. | | |
| 2010/0092252 A1 | 4/2010 | Force et al. | | |

FOREIGN PATENT DOCUMENTS

| WO | WO 2006/079774 | 8/2006 |
|---|---|---|
| WO | WO2008045173 | 4/2008 |

* cited by examiner

DISCHARGE SYSTEM TO REMOVE SOLIDS FROM A VESSEL

CROSS-REFERENCE TO RELATED APPLICATIONS

This application is a National Stage application under 36 U.S.C. §371 of International Application No. PCT/US2007/019650, filed Sep. 10, 2007, that claims the benefit of Ser. No. 60/850,552, filed Oct. 10, 2006, the disclosures of which are incorporated by reference.

FIELD OF THE INVENTION

This disclosure relates generally to a discharge system and method for removing a solid/gas mixture from a pressure vessel with minimum gas loss. More specifically, this disclosure relates to a system and method for removing solids from a fluidized bed pressure vessel with minimum gas removal.

BACKGROUND OF THE INVENTION

There are many systems and known methods for discharging solids from a fluidized bed pressure vessel, gas phase fluidized bed pressure vessel, or gas phase fluidized bed polymerization vessel. However, the use of existing discharge systems and methods can result in excess loss of reactant from the discharge system. Specifically, a significant amount of the gas or gas/liquid mixture is lost because the void space within and around the particles is filled with the high pressure gas mixture. The lost gas must then be either replaced, consuming additional raw materials, or recycled back into the system via compression, condensation with pumping, or a combination of these. In either scenario, raw materials are wasted and energy consumed.

One process that involves the discharge of a gas/solids mixture from a pressure vessel is the process for the manufacture of polyolefin resins, thereby involving the polymerization of olefin monomers in a fluidized bed reactor. An example of a process for the manufacture of polyolefin resins is disclosed in U.S. Pat. No. 4,003,712 ("the '712 patent"). As therein defined, a product is discharged from the reaction zone through a gas lock zone and the unreacted monomer that accompanies the resin is vented and recycled back to the reaction zone by compression. The product is then transferred to downstream equipment via a conventional dilute phase conveying system.

An alternative discharge system is described in U.S. Pat. No. 4,621,952 ("the '952 patent"). Referring to FIG. 1, a prior art gas lock zone system involving multiple settling vessels operating in series, is shown. The '952 patent describes that the gas mixture lost from the process could be significantly reduced by using the gas displacing ability of solids using two or more vessels with pressure equalization between each. As practiced today, a valve 10 between a nozzle on the fluidized bed pressure vessel 1 and settling vessel 4 is opened, and solids along with pressurized gas enter settling vessel 4. A second connection 9 between the top of settling vessel 4 to a slightly lower pressure section of the reactor provides a flow path for the gas while solids settle out to essentially fill settling vessel 4. Both valves 10 and 9 are then closed, leaving settling vessel 4 full of the solid particles, but with interstitial spaces between the particles filled with the gas mixture, and settling vessel 4 at full reactor pressure.

A valve (shown but not numbered) is then opened and solids are transferred to a transfer tank 13. As the solids flow into transfer tank 13, pressure equalization also occurs between transfer tank 13 and product chamber tank 4. Upon completion, the pressure in transfer tank 13 and product chamber tank 4 is less than the reactor pressure and the product may be transferred to other vessels for additional processing with only a modest pressurized gas transfer therein.

Once empty, the role of each vessel changes to the gas receiver function described above. The gas received by the settling vessel 4 is then transferred back into the fluidized bed pressure vessel 1 during the next fill cycle. While more effective than the process described by the '712 patent, the '952 patent has some drawbacks. Initially, the fluidized bed pressure vessel must be elevated because the settling vessels and product tanks are stacked and located below the fluidized bed. Furthermore, the transference of the solid from the settling vessels to the product tanks requires time, therein limiting the number of discharge cycles possible in a given period (typically to 20 to 30 discharges per hour). Moreover, because the tanks work in series, if any one tank in a series pair is taken out of service for cleaning or maintenance, the entire series is inoperative, and the gas losses from the other series in a series pair is increased.

U.S. Pat. Nos. 6,255,411 and 6,498,220 describe improvements to the gas lock concept using two parallel sets of vessels with two or three series vessels per set. This prior art discharge system has multiple pressure equalization steps to improve efficiency. In such an arrangement if one tank must be removed from service for cleaning it disables all tanks in a vertical set, but allows continued operation with the other parallel set. However, capacity is essentially cut in half and recovery efficiency is reduced as the cross set equalizations are not available. The '411 patent offers a faster cycle time, but during some steps, there is only one closed valve to prevent blow-by of pressurized gases to downstream equipment.

Other background references include U.S. Pat. No. 6,472,483, EP 0 250 169 A, and WO 2006/079774.

Accordingly, there exists a need for a method to remove solids from a fluidized bed pressure vessel with a reduced loss of gas and reactants, and wherein the discharge system allows, for example, for at least one of a higher discharge capacity, less downtime due to maintenance, greater efficiency in the processing of solids, and improved safety.

SUMMARY OF THE INVENTION

One embodiment of the invention disclosed herein relates to a discharge system for removing a solids from a fluidized bed pressure vessel. The discharge system comprises: a plurality of settling vessels arranged in parallel; a discharge line fluidly connecting a fluidized bed pressure vessel to at least one of the plurality of settling vessels; a primary discharge valve to control a discharge flow of a fluid mixture to at least one of the plurality of settling vessels; a vent line fluidly connecting the fluidized bed pressure vessel and at least one of the plurality of settling vessels; a primary vent valve to control a vent the flow through the vent line; a crosstie line fluidly connecting at least two of the plurality of settling vessels; a crosstie valve to control a crosstie flow through the crosstie line; and a primary exit valve to control an exit flow of the fluid mixture exiting the at least one of the plurality of settling vessels, wherein the discharge system is absent a transfer tank, and wherein the plurality of settling vessels are absent a filter element. In some embodiments, the fluidized bed pressure vessel may be a gas phase fluidized bed polymerization vessel.

In other embodiments of the invention, at least one of the plurality of settling vessels further comprises a conical top head.

Still other embodiments of the invention may further comprise a solids monitoring device connected to at least one of the plurality of settling vessels.

In still other embodiments, the discharge system may further comprise a plurality of secondary discharge valves in series with the primary discharge valve, wherein the primary discharge valve and at least one secondary discharge valve is located between the fluidized bed pressure vessel and at least one settling vessel, and wherein both the primary discharge valve and the secondary discharge valve control the discharge flow to the at least one of the plurality of settling vessels.

In yet another embodiment, the invention may comprise at least two settling vessels fluidly connected to the fluidized bed pressure vessel through a common primary discharge valve.

In yet another embodiment, the invention may further comprise: a secondary vent valve in series with the primary vent valve and between the fluidized bed pressure vessel and at least one settling vessel; and/or at least two settling vessels fluidly connected to the fluidized bed pressure vessel through a common primary vent valve.

In other embodiments, the invention further comprises a secondary exit valve, wherein both the primary exit valve and the secondary exit valve control the exit flow from at least one of the plurality of settling vessels.

In still other embodiments, the invention may comprise: at least three settling vessels; at least three crosstie lines, and at least one multi-port valve, wherein the multi-port valve fluidly connects the at least three crosstie lines.

In yet other embodiments, the discharge system may comprise: at least four settling vessels; at least four crosstie lines; a first set of crosstie lines comprising a first of the at least four crosstie lines and a second of the at least four crosstie lines; a second set of crosstie lines comprising a third of the at least four crosstie lines and a fourth of the at least four crosstie lines; and at least two multi-port valves, wherein the at least two multi-port valves fluidly connect the first set of crosstie lines to the second set of crosstie lines.

In another embodiment, the invention may further comprise: a dry-gas purge fed to at least one of the plurality of settling tanks; a clean-gas purge fed to at least one of the plurality of discharge lines; or a crosstie valve that is a flow-controlling type valve.

In another aspect of the invention, embodiments disclosed herein relate to a method for removing solids from a fluidized bed pressure vessel. The method may include the steps of: providing a discharge system comprising a plurality of settling vessels arranged in parallel, wherein the discharge system is absent a transfer tank, and wherein the plurality of settling vessels are absent a filter element; filling a first settling vessel with a mixture from a fluidized bed pressure vessel, wherein said mixture comprises a solid and a pressurized gas; equalizing the first settling vessel with at least a second settling vessel, wherein the pressurized gas is transferred between the first settling vessel and the second settling vessel; and emptying the first settling vessel.

In other embodiments of the method, the equalizing step comprises repressurization of at least one of the plurality of settling vessels.

In yet other embodiments of the method, the equalizing step comprises depressurization of at least one of the plurality of settling vessels.

In yet other embodiments of the method, the equalizing step comprises repressurization and depressurization of at least one of the plurality of settling vessels.

In still other embodiments, the method further comprises recycling the pressurized gas transferred between at least one of the settling vessels and the fluidized bed pressure vessel.

In yet other embodiments of the method, the equalizing step comprises repressurization and depressurization of at least two of the plurality of settling vessels.

In yet another embodiment, the method further comprises equalizing at least one of the plurality of settling vessels with at least two of the plurality of settling vessels.

In other embodiments, there is always at least two valves closed between the fluidized bed pressure vessel and a downstream vessel, wherein the downstream vessel is downstream of the at least one of the plurality of settling vessels.

Other embodiments of the method further comprise the step of: clean-gas purging a discharge line; clean-gas purging a vent line; or dry-gas purging at least one of the settling vessels.

In another embodiment, the method further comprises the steps of: providing at least three settling vessels; first depressurizing the first settling vessel by transferring a first portion of the pressurized gas from the first settling vessel to the second settling vessel after the filling step; second depressurizing the first settling vessel by transferring a second portion of the pressurized gas from the first settling vessel to a third settling vessel after the first depressurizing step; emptying the solid out of the first settling vessel after the second depressurizing step; first repressurizing the first settling vessel by transferring a first return portion of the pressurized gas from the second settling vessel to the first settling vessel after the emptying step; and second repressurizing the first settling vessel by transferring a second return portion of the pressurized gas from the third settling vessel to the first settling vessel after the first repressurizing step.

Other embodiments of the method further comprise the steps of: providing at least a fourth settling vessel; third depressurizing the first settling vessel by transferring a third portion of the pressurized gas from the first settling vessel to the fourth settling vessel after the second depressurizing step and before the emptying step; and third repressurizing the first settling vessel by transferring a third return portion of the pressurized gas from the fourth settling vessel to the first settling vessel after the second repressurizing step.

The method may further comprise the steps of: transferring the pressurized gas from the fourth settling vessel to the third settling vessel at least partially concurrently with the first depressurizing step; and filling the second settling vessel with the mixture from the fluidized bed pressure vessel at least partially concurrently with the second depressurizing step.

The method may still further comprise the steps of: emptying the solid out of the fourth settling vessel at least partially concurrently with the second depressurizing step; and transferring the pressurized gas from the second settling vessel to the third settling vessel at least partially concurrently with the third depressurizing step.

Other embodiments of the method may further comprise the steps of: filling the third settling vessel with the mixture from the fluidized bed pressure vessel at least partially concurrently with emptying the first settling vessel; filling the fourth settling vessel with the mixture from the fluidized bed pressure vessel at least partially concurrently with the second repressurizing step; and transferring the solid out of the second settling vessel at least partially concurrently with the second repressurizing step.

Further yet, the method may comprise the steps of: transferring the pressurized gas from the third settling vessel to the fourth settling vessel at least partially concurrently with the first repressurizing step; and transferring the pressurized gas from the third settling vessel to the second settling vessel at least partially concurrently with the third repressurizing step.

In another embodiment, the method further provides that a volume of discharged solid particles filling the settling vessel is: at least 95% of an actual volume of the settling vessel; at least 98% of the actual volume of the settling vessel; at least 100% of the actual volume of the settling vessel; greater that about 90% of a valved-in volume; or greater than about 100% of the valved-in volume.

Other features and advantages of the present invention will become apparent from the following detailed description. It should be understood, however, that the detailed description and the specific examples, while indicating preferred embodiments of the invention, are given by way of illustration only, since various changes and modifications within the spirit and scope of the invention will become apparent to those skilled in the art from this detailed description.

BRIEF SUMMARY OF THE DRAWINGS

The following drawings form part of the present specification and are included to further demonstrate certain aspects of the present invention. The invention may be better understood by reference to one or more of these drawings in combination with the detailed description of specific embodiments presented herein.

DETAILED DESCRIPTION OF THE INVENTION

Generally, embodiments disclosed herein relate to discharge systems for removing a solid/gas mixture from a pressurized vessel. More specifically, embodiments disclosed herein relate to discharge systems for removing flowable solid particles from a pressurized and fluidized vessel, minimizing the removal of gas or gas/liquid mixtures there from.

Figure 2A:
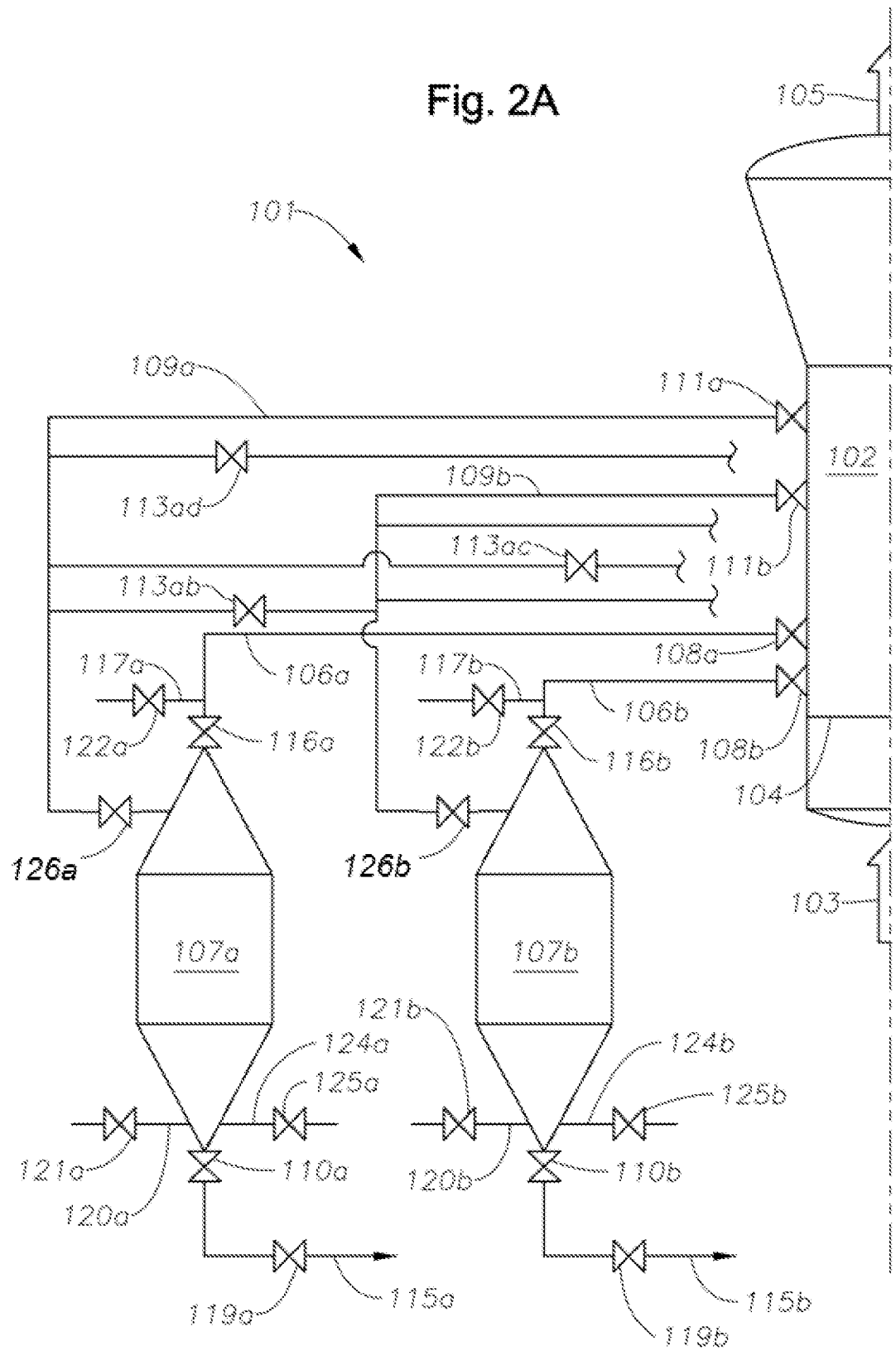
FIGS. 2A and 2B are schematic drawings of an embodiment of a discharge system in accordance with the present disclosure.
Figure 2B:
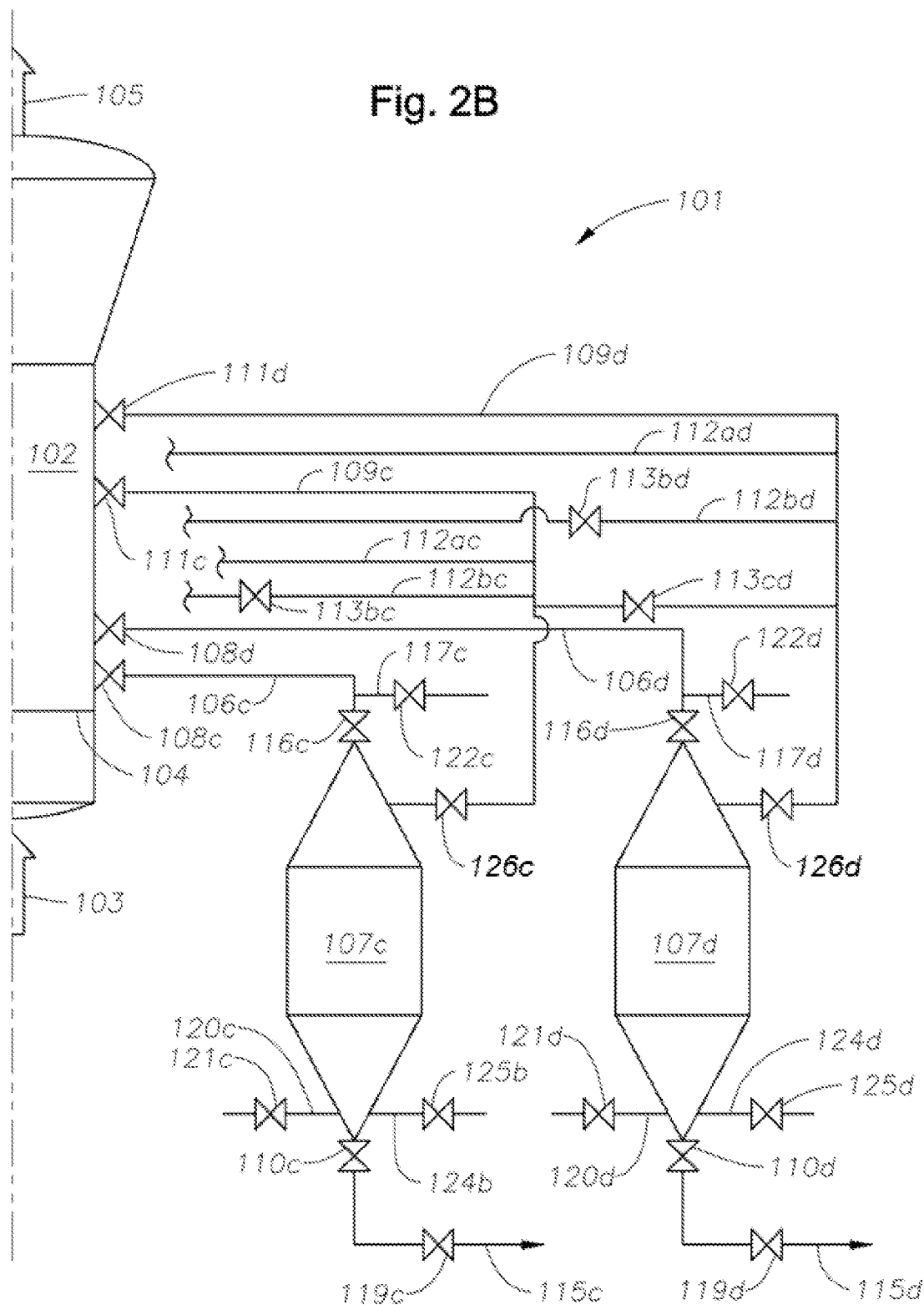

Referring initially to FIG. 2, a schematic view of a discharge system 101 in accordance with one embodiment of the present disclosure is shown. Generally, a granular solid is fluidized in a fluidized bed pressure vessel 102 by a flow of gas or gas/liquid mixture from an inlet 103, through a gas distributor 104, and exiting the fluidized bed pressure vessel 102 through outlet 105 for recycling. The fluidized bed pressure vessel 102 may be a reactor, a polymerization reactor, a vessel capable of holding a fluidized solid, or any pressure vessel from which a granular, powder, or particulate solid product may be removed.

Still referring to FIG. 2, a discharge system 101 is generally configured with a settling vessel 107a-d, a discharge line 106a-d, a primary discharge valve 108a-d, a vent line 109a-d, a primary vent valve 111a-d, and a primary exit valve 110a-d. Although this disclosure only discusses components necessary for functionality within the present disclosure, the discharge system 101, one of ordinary skill in the art will recognize that additional components not discussed herein including, for example, pressure monitoring equipment, additional release valves, fill sensors, safety regulators, or any other component beneficial in the removal of a solid from a fluidized bed pressure vessel may be optionally included.

One embodiment of the invention provides a discharge system 101 for removing solids from a fluidized bed pressure vessel comprising: a plurality of settling vessels 107a-d arranged in parallel; a discharge line 106a-d fluidly connecting a fluidized bed pressure vessel 102 to at least one of the plurality of settling vessels 107a-d; a primary discharge valve 108a-d to control a discharge flow of fluid to at least one of the plurality of settling vessels 107a-d; a vent line 109a-d fluidly connecting the fluidized bed pressure vessel 102 and at least one of the plurality of settling vessels 107a-d; a primary vent valve 111a-d to control the flow of fluid through the vent line 109a-d; a crosstie line 112ab, ad, ac, bc, bd, cd (112ab, cd not labeled on drawing) fluidly connecting at least two of the plurality of settling vessels 107a-d; a crosstie valve 113ab, ad, ac, bc, bd, cd to control the flow of fluid through the crosstie line 112ab, ad, ac, bc, bd, cd; and an primary exit valve 110a-d to control the exit flow of solid and gas exiting the plurality of settling vessels 107a-d, wherein the discharge system 101 is absent a transfer tank, and wherein the settling vessels 107a-d are absent a filter element.

While the discharge system 101, as illustrated, includes four settling vessels 107a-d, it should be realized that other discharge systems may include any number of settling vessels 107a-d capable of configuration in accordance with the present disclosure. In certain embodiments, the addition of more or less settling vessels 107a-d may increase the capacity and efficiency of gas retention. The plurality of settling vessels 107a-d are arranged in parallel, thus solid material flows from the fluidized bed pressure vessel 102 to any one of the settling vessels 107a-d. As used herein, arranged in parallel refers to an arrangement of settling vessels such that each settling vessel takes a mixture containing a solid material from the fluidized bed pressure vessel and passes the solid material on to downstream equipment without a substantial amount of the solid material having to flow through the other settling vessels. In one preferred embodiment, each settling vessel may be operated independently of the other settling vessels.

To remove solids from the fluidized bed pressure vessel 102, a plurality of discharge lines 106a-d may be configured to fluidly connect the fluidized bed pressure vessel 102 to the plurality of settling vessels 107a-d. It may be desirable to minimize the length of the discharge line 106a-d. In some embodiments, the discharge line 106a-d is self draining. In other embodiments, the discharge line 106a-d may be swept clean with a clean-gas purge 117a-d. The clean-gas purge 117a-d may be from a fresh monomer feed, inert feed, or may be recycle gas flow from the discharge of a recycle compressor (not shown), bottom head, or other higher pressure source. In some preferred embodiments, each settling vessel 107a-d will have a clean gas purge 117a-d, and clean gas purge valve 122a-d, whereas in other embodiments, at least two settling vessels will have a single clean gas purge 117a-d, and clean gas purge valve 122a-d.

The settling vessels 107a-d are filled with a discharge flow of a discharge fluid, preferably comprising a mixture of solids and gas. To control the discharge flow from the fluidized bed pressure vessel 102 to the settling vessels 107a-d, a primary discharge valve 108a-d is located along the discharge line 106a-d. As one of the primary discharge valves 108a-d is opened, the solid/gas mixture flows under pressure from fluidized bed pressure vessel 102 to at least one of the settling vessels 107a-d.

To maximize the volume of solids that fill the settling vessel 107a-d and thus minimize the amount of gas escaping in the discharge system 101, a vent line 109a-d fluidly connects at least one of the settling vessels 107a-d to a lower pressure region of fluidized bed pressure vessel 102. A primary vent valve 111a-d is located along vent line 109a-d to control a vent flow of gas in the vent line 109a-d between the settling vessel 107a-d and the fluidized bed pressure vessel 102. In one embodiment, the primary vent valve 111a-d is located in the vertical piping section so that it is self draining. Furthermore, in some embodiments, the primary vent valve 111a-d is located close to the settling vessel 107a-d to reduce the valved-in volume of the settling vessel/piping combination. In the latter two embodiments, a vent purge (not shown) of clean gas is then used to prevent material settling in the vertical section of vent line 109a-d from the primary vent valve 111a-d to vessel 102 when the primary vent valve 111a-d is closed. In other embodiments, primary vent valve 111a-d is located at vessel 102. In yet another embodiment, the primary vent valve 111a-d is located close to vessel 102 and a secondary vent valve 126a-d is located in the vent line 109a-d close to the settling vessel 107a-d. This arrangement can decrease the valved-in volume with no purging of the vent line 109a-d.

Still referring to FIG. 2, the process is described below in reference to one train in the system. Each train will step through the same steps individually. Initially, valve 108a opens and a solid gas mixture flows from pressure vessel 102 to settling vessel 107a. Additionally, primary vent valve 111a is open, allowing the gas or a gas/liquid mixture to flow back to a lower pressure region of pressure vessel 102. In a fluidized bed system, the pressure differential between the bottom and top of the fluidized bed results in a flow path between a lower part of pressure vessel 102 to settling vessel 107a, and the up to a higher part of pressure vessel 102 where the pressure is lower. When settling vessel 107a is determined to be filled, valves 108a and 111a may be closed. Settling vessel 107a may be deemed filled as determined by any number of variables including, for example, a preset time, level measurement, pressure condition, change in solids concentration in the vent line 109a, or any other means as selected by a discharge system operator.

Still referring to FIG. 2, a crosstie line 112ab, ad, ac, bc, bd, cd fluidly connects at least two of the plurality of settling vessels 107a-d together. In one embodiment, a plurality of crosstie lines 112ab, ad, ac, bc, bd, cd connect the plurality of settling vessels 107a-d together. The crosstie lines 112ab, ad, ac, bc, bd, cd allow the flow of gas between settling vessels 107a-d. The crosstie valve 113ab, ad, ac, bc, bd, cd controls a crosstie flow of fluid, typically a reactor gas mixture, through the crosstie line 112ab, ad, ac, bc, bd, cd. As illustrated, the crosstie lines 112ab, ad, ac, bc, bd, cd extend from the vent lines 109a-d; however, one of ordinary skill in the art will recognize that the crosstie lines 112ab, ad, ac, bc, bd, cd may be independent of the vent line 109a-d, so long as gas may flow between each of the plurality of settling vessels 107a-d. In one preferred embodiment, the crosstie lines are self draining (by gravity). In some preferred embodiments, the crosstie flow rate is restricted so that the solid material in the settling vessel 107a-d is not fluidized, which can result in excessive solid particle carryover. This restriction may be done with an orifice, flow nozzle, or by the use of a crosstie valve 113ab, ad, ac, bc, bd, cd that is a flow-controlling type. Preferred flow-controlling-type crosstie valves include eccentric plug rotary valves, V-ball valves, and other valves designed to gradually increase the open area and regulate the flow rate, preferably the initial flow rate, as the valve is opened.

Carryover of solid particles with the crosstie flow can result in solid particles, such as polymer particles, being left in the crosstie lines 112ab, ad, ac, bc, bd, cd. Reactive solids left in the crosstie lines 112ab, ad, ac, bc, bd, cd can continue to react, causing operating problems. In particular, polymer particles can polymerize between discharge cycles and plug the crosstie line 112ab, ad, ac, bc, bd, cd. However, if the discharge cycle time is fast, the risk of continued reaction resulting in agglomeration is low and the crossties may be designed for faster transfer with instantaneous fluidization of the material in the settling vessel 107a-d and a resulting carry-over to the receiving settling vessel.

The primary exit valve 110a-d controls the flow of solid and gas exiting each of the plurality of settling vessels 107a-d. The primary exit valve 110a-d is located on the outlet of each of the plurality of settling vessels 107a-d to allow the collection of the solids in the settling vessels 107a-d. So long as primary exit valve 110a-d is closed, the solid and gas or residual gas/liquid mixture may collect in settling vessel 107a-d.

The discharge system 101 of the embodiment shown in FIG. 2 is absent a transfer tank. A transfer tank, as used herein, describes a second pressure vessel in series with the settling vessels, wherein the second tank is a gas lock vessel as described in U.S. Pat. No. 4,621,952 discussed above.

In other embodiments, the discharge system 101 is absent a filter element to filter fluids exiting the settling vessels 107a-d via significant process streams. Significant process streams refers to streams exiting the settling vessels 107a-d through the vent lines 109a-d, the crosstie lines 112ab, ad, ac, bc, bd, cd, or other substantial process streams. Filter elements, as used herein, refers to filter elements located in the substantial process streams designed to preclude the carry-over of most of the solid particles out of the settling vessels 107a-d when the gas exits the settling vessels 107a-d. Filter elements, as used herein, does not refer to elements used to exclude particles from non-significant streams, for example pressure taps or analyzer taps fluidly connecting an instrument to a settling vessel 107a-d. Filter elements, such as sintered metal filters, are typically used in systems described in U.S. Pat. No. 4,003,712 described above.

Figure 6:
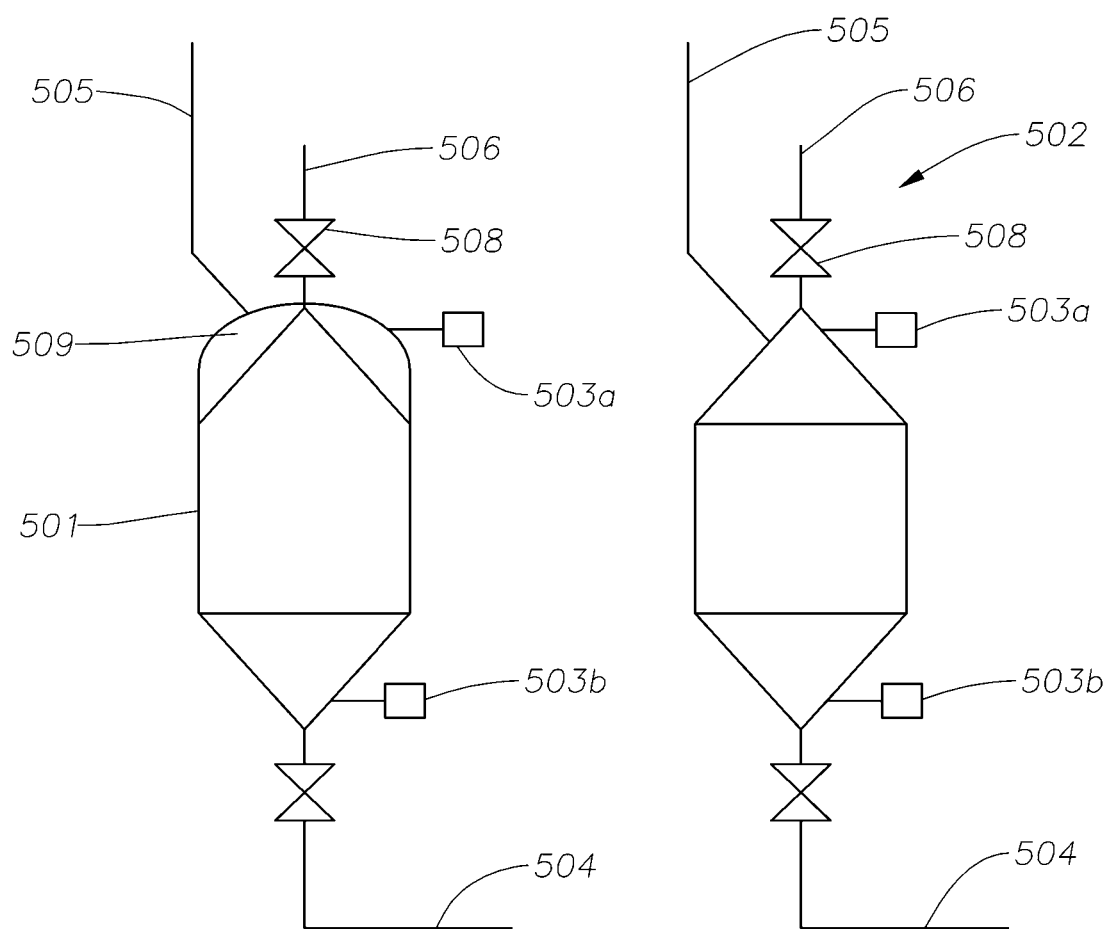
FIG. 6 is a schematic drawing of settling vessels with elliptical and conical top heads in accordance with embodiments of the present disclosure.

In one embodiment of the invention, the settling vessel 107a-d comprises a conical top head. Referring now to FIG. 6, a cross-section drawing of a settling vessel 501 with an elliptical top head and a settling vessel 502 with a conical top head is shown. Specifically, a settling vessel 501 with an elliptical top head is showing being filled from a discharge line 506 through a discharge line valve 508. As a solid product fills settling vessel 501, areas of unfilled space 509 form along the sides of the elliptical top head. During vessel filling, unfilled space 509 may result in the storage of residual gas or gas/liquid mixture, such that upon vessel emptying, gas or gas/liquid mixture may not be recovered by the discharge system. To reduce the amount of open area inside the settling vessels, vessel 502 with a conical top head may be used in accordance with certain embodiments of the disclosed discharge system. As illustrated, during vessel filling, settling vessel 502 with the conical top head reduces the storage of residual gas or gas/liquid mixture in open areas. Because the contours of the conical top head may more closely approximate the fill pattern of the solid product, less gas is contained in the settling vessel 502, and less gas may be lost during vessel emptying. Thus, in accordance with embodiments of the present disclosure, it may be beneficial to provide conical top heads for settling vessels to decrease the storage of residual gas and gas/liquid.

Still referring to FIG. 6, a discharge system of the current invention may further comprise a solids monitoring device 503a-b, connected to at least one settling vessel 501, 502. The solids monitoring device 503a-b, may be any device known to one of ordinary skill in the art that detects the presence of a solid in a pressurized vessel. For example, the solids monitoring device 503a-b, may be a nuclear level detection device, a tuning fork based level detection device, static probes, pressure monitors, acoustic emissions, or entrainment devices. The solids monitoring device 503a-b may be an upper solids monitoring device 503a located near the top of the settling vessel 501, 502, in the vent line 505, or any other suitable location to measure when the tank is full. Alternately, the solids measuring device may be a lower solids monitoring device 503b located near the bottom of the settling vessel 501, 502, in the conveying line 504, or any other suitable location that allows the lower solids monitoring device 503b to detect when the settling vessel 501, 502 empties completely. Addition of a solids monitoring device 503a-b may allow the discharge system to detect the fill rate in a settling vessel, and adjusting any one of the filling, depressurizing, repressurizing, or emptying of any other settling vessel such that the efficiency of the process is increased. One of ordinary skill in the art will realize that any number of fill devices may be used in a given discharge system, and may be placed in multiple locations.

Referring again to FIG. 2, in one embodiment of the invention, the discharge system further comprises a plurality of secondary discharge valves 116a-b in series with the primary discharge valve 108a-d, wherein the primary discharge valve 108a-d and at least one of the secondary discharge valves 116a-d is located between the fluidized bed pressure vessel 102 and at least one settling vessel 107a-d, and wherein both the primary discharge valve 108a-d and the secondary discharge valve 116a-d control the discharge flow to the at least one settling vessel 107a-d. Adding the secondary discharge valve 116a-d close to the settling vessel 107a-d improves the discharge system efficiency, by reducing closed-valve volume. Furthermore, the secondary discharge valve 116a-d enables adding a clean-gas purge 117a-d of the discharge line 106a-d after the settling vessel 107a-d has been filled. In one embodiment, the secondary discharge valve 116a-d is closed and primary discharge valve 108a-d is open during the clean-gas purge step. The clean-gas purge preferably has a clean-gas purge valve 122a-d to control the flow of clean-gas. In all embodiments disclosed herein, the primary discharge valve 108a-d, the secondary discharge valve 116a-b, and any other valves disclosed are automatically controlled and actuated valves.

In yet another embodiment of the current invention, a dry-gas purge 120a-d is fed to the settling tank 107a-d. The dry-gas purge 120a-d preferably has a dry-gas purge valve 121a-d to control the flow of dry-gas. In some applications a fluidized bed polymerization reactor may be operated with a liquid phase present. This could be from injecting liquid feeds or recycle into the reactor or condensed mode operation where the gas composition and inlet temperature allows for condensation of heavier hydrocarbons. It is known in the art that when removing solid particles from a fluidized bed pressure vessel 107a-d operating in condensing or super-condensing mode, the solid particles may be saturated with liquid, and/or liquid may enter the settling tank when the filling step is executed. To facilitate the displacement of any liquids present, the dry-gas purge 120a-d may be fed into the settling tank 107a-d during any suitable step in the process, and preferably during the filling step, more preferably during the filling step after the discharge valve 108a-d has closed, but before the primary vent valve 111a-d is closed. The dry-gas purge 120a-d is preferably added at a rate that does not cause fluidization in the discharge tank. In some embodiments of the invention, the dry-gas purge 120a-d is fed into the lower section of the settling tank 107a-d. The dry gas purge 120a-d is preferably a gas compatible with the process, as some of this gas will be recycled up into the fluidized bed pressure vessel. In one embodiment, the dry-gas purge 120a-d is a cycle gas taken from a point in the fluidized bed process where liquids are not present, such as the outlet of the fluidized bed pressure vessel 102. In one embodiment, the dry gas is taken downstream of the compressor that is recirculating material through the fluidized bed pressure vessel but before a cycle gas cooler that cause condensation. In some embodiments, the dry-gas purge 120a-d may be an inert to the process, such as nitrogen in a polymerization process.

Figure 4A:
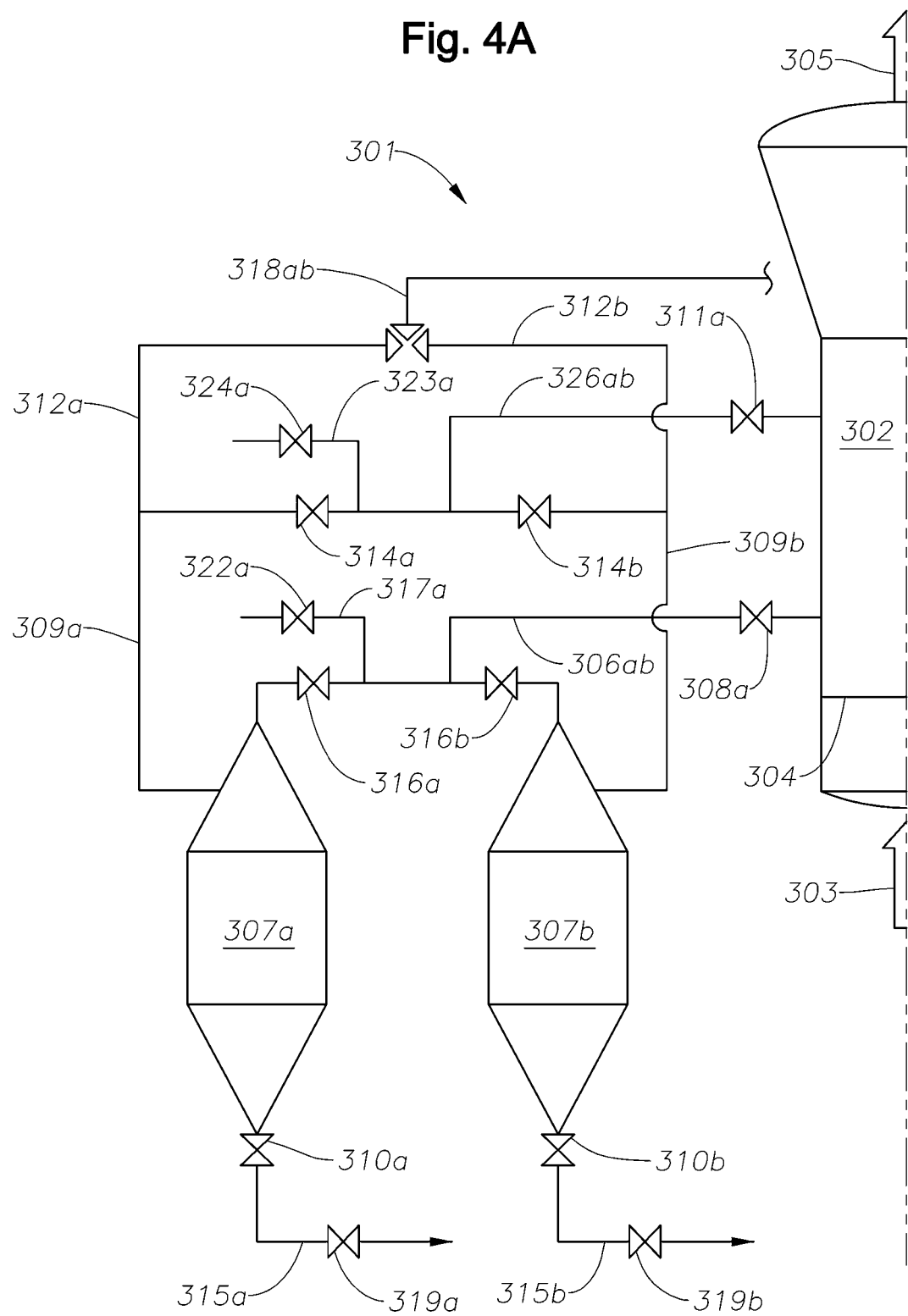
FIGS. 4A and 4B are schematic drawings of another embodiment of a discharge system in accordance with the present disclosure.
Figure 4B:
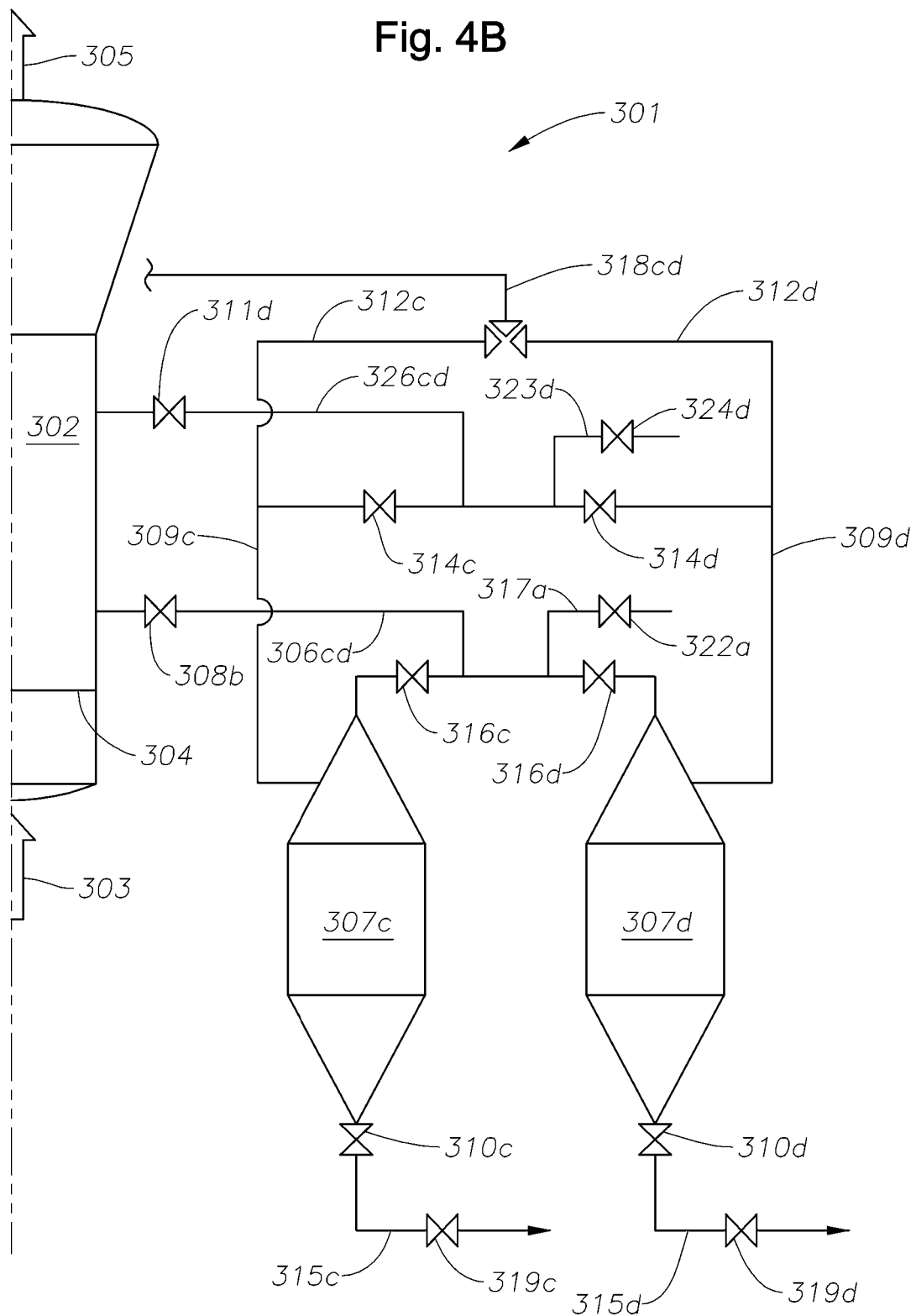

Referring now to FIG. 4, in one embodiment of a discharge system 301, the connections between the fluidized bed pressure vessel 302 and the plurality of settling vessels 307a-d, as well as the connections between the plurality of settling vessels 307a-d may be reduced as compared to the embodiments described in FIG. 2. Specifically, at least two of the plurality of settling vessels 307a-d share a common discharge line 306ab, cd and a common primary discharge valve 308a, b. The grouping of settling vessels 307a-d into at least pairs decreases the amount of connections required to transfer solids from the fluidized bed pressure vessel 302. Additionally, a plurality of secondary discharge valves 316a-d may be added to control the flow of solids between the fluidized bed pressure vessel 302 and individual settling vessels 307a-d. Thus, in one embodiment of the invention, at least two settling vessels 307a-d are fluidly connected to the fluidized bed pressure vessel 302 through the common primary discharge valve 308a, b.

Still referring to FIG. 4, to reduce the amount of connections necessary to transfer gas between the fluidized bed pressure vessel 302 and the settling vessels 307a-d, one embodiment of the invention ties at least two vent lines 309a-d together to route the process flow through a common vent line 326ab, cd and a common primary vent valve 311a, d. In this embodiment, there is secondary vent valve 314a-d in series with the common primary vent valve 311a, d. Thus, for example, for fluid to flow between the fluidized pressure vessel 302 and a first settling vessel 307a, both the common primary vent valve 311a and a first secondary vent valve 314a must be open, while a second secondary vent valve 314b is closed. Thus, this embodiment of the invention comprises at least two valves, a common primary vent valve 311a, d and a secondary vent valve 314a-d, in series between the fluidized bed pressure vessel 302 and at least one settling vessel 307a-d to allow at least two settling vessels 307a-d (for example a first settling vessel 307a and a second settling vessel 307b) to share the common primary vent valve 311a, d. Some embodiments further comprise a vent-line purge 323a, d and a vent line purge valve 324a, d to sweep any solid particles in the common vent line 326ab, cd into the fluidized bed pressure vessel 307a-d. The vent line purge gas is preferably a fresh monomer feed, inert feed, or may be recycle gas flow from the discharge of a recycle compressor (not shown), bottom head, or other pressure source.

Referring again to FIG. 2, in yet another embodiment, each vent line 109a-d may be separate, and still include two vent valves in series, a primary vent valve 111a-d located closer to the fluidized bed pressure vessel 102, and a secondary vent valve (not shown) located closer to the settling vessel 107a-d. In this embodiment, a vent line purge and vent line purge valve as described above may be desirable.

Now referring back to FIG. 4, to reduce the amount of connections necessary to transfer gas between the settling vessels 307a-d, in one embodiment, the discharge system 301 uses a multi-port valve 318ab,cd. The multi-port valve 318ab, cd can control the flow from at least two settling vessels 307a-d, allowing the transfer of gas there between. As illustrated in FIG. 4, a first multi-port valve 318ab may control flow between a first settling vessel 307a and a second settling vessel 307b, and may control the flow from a first settling vessel 307a or a second settling vessel 307b to a third settling vessel 307c or a fourth settling vessel 307d via connection to a second multi-port valve 318cd. The multi-port valves 318ab,cd may be configured to allow the transfer of gas between any two of the settling vessels 307a-d. While this embodiment illustrates a discharge system 301 with four settling vessels 307a-d and two multi-port valves 318ab,cd, it should be realized that the number of settling vessels and multi-port valves may vary as required by different discharge systems. For example, an alternate discharge system may be foreseen wherein four vessels are connected by one multi-port valve, or wherein any number of vessels are connected by any number of multi-port valves. Additionally, the number of ports on the multi-port valve may vary such that in certain embodiments, a single multi-port valve may accept vent lines from any number of settling vessels.

Referring again to FIG. 2, contemporaneous with the filling phase of the settling vessel 107a, settling vessel 107c may be in a discharge phase. During this discharge phase, settling vessel 107c is isolated from other settling vessels in the discharge system 101. Specifically, primary exit valve 110c connecting settling vessel 107c to downstream equipment is closed. Additionally, any crosstie valves 113ab, ad, ac, bc, bd, cd connecting settling vessel 107c to any other settling vessel will be closed. During the emptying step, primary discharge valve 108c is closed and primary exit valve 110c is opened, allowing the solid/gas mixture may be discharged from discharge system 101. As the solid/gas mixture exits discharge system 101, the solids may be transferred downstream equipment. While any granular solid transfer method may be used, one preferred method uses a conveying assist gas fed through a conveying assist gas line 124a-d and controlled by a conveying assist valve 125a-d. The conveying assist gas is preferably injected into the lower part of the settling vessel 107a-d. The conveying assist gas is preferably an inert, a dry-gas purge, a recycled gas, nitrogen, or a byproduct gas from downstream operations, such as vent recovery.

As described immediately above, there is a single layer of protection against high pressure gas flowing to downstream equipment. During the fill cycle only the primary exit valve 110a-d is closed between the fluidized bed pressure vessel 107a-d and downstream equipment. During the emptying step, only primary discharge valve 108a-d and primary vent valve 111a-d are closed between the fluidized bed pressure vessel 107a-d and downstream equipment. In addition there is only one closed valve in each crosstie line 112ab, ad, ac, bc, bd, cd. As a result a single failure of a valve, valve actuator, or control could result in a direct passage from the high pressure reactor to downstream equipment. Still referring to FIG. 2, this risk can be addressed by the addition of a secondary exit valve 119a-d in each conveying line 115a-d, wherein the secondary exit valve 119a-d is automatically actuated and is closed if a failure or abnormal situation is detected. This detection may be by monitoring the position of the other critical valves, by monitoring the pressure in downstream equipment, or by monitoring the pressure and pressure time-decay within the conveying line 115a-d. Alternative means of protecting the downstream equipment such as elevated pressure ratings or enlarged pressure relief systems are possible but may be more costly and have other operational drawbacks. In all embodiments disclosed herein, the primary exit valve 110a-d and the secondary exit valve 119a-d are automatically actuated valves.

Still referring to FIG. 2, each settling vessel 107a-d may have its own conveying line 115a-d to downstream processing equipment. In other embodiments, any number of settling vessel 107a-d may also share a common conveying line (not shown). In this later embodiment, each settling vessel has its own primary exit valve 110a-d which is opened during the transfer.

In the embodiments disclosed herein, the valves disclosed are automatically actuated valves, preferably full port, quick acting valves such as ball, cylinder, cam, or gate valve designed for reliable, high-cycle operation. Preferred valves include metal seated, trunnion supported ball valves. In some embodiments, the primary discharge valve 108a-d and/or the primary vent valve 111a-d are designed to minimize the space between the sealing element and the interior of the pressurized vessel 102. The automatically actuated valves are typically controlled by an automated control system, such a sequence logic control system or similar system.

Referring again to FIG. 4, in one embodiment of the discharge system comprises at least three settling vessels 307a-d; at least three crosstie lines 312, and at least one multi-port valve, wherein the multi-port valve fluidly connects the at least three crosstie lines.

Still referring to FIG. 4, in one embodiment of the discharge system comprises at least four settling vessels 307a-d; at least four crosstie lines 312; a first set of crosstie lines comprising a first of the at least four crosstie lines 312a and a second of the at least four crosstie lines 312b; a second set of crosstie lines comprising a third of the at least four crosstie lines 312c and a fourth of the at least four crosstie lines 312d; and at least two multi-port valves 318ab, 318cd, wherein the at least two multi-port valves fluidly connect the first set of crosstie lines to the second set of crosstie lines.

Referring back to FIG. 2, in order to minimize the discharge valve cycle time of discharge system 101, the filling of the first settling vessel 107a may occur concurrently with or substantially overlapping with the discharge of solids from settling vessel 107c. To further increase the efficiency and processing capacity of discharge system 101, settling vessels 107b and 107d may be in a pressurization equalization phase while the first settling vessel 107a is filling.

In one embodiment, while the first settling vessel 107a is in the filling step, settling vessel 107d may be substantially filled with a solid/gas mixture. At the same time, settling vessel 107b may be substantially empty. Concurrently, settling vessel 107b may be isolated by valves 108b and 111b. At this step, because settling vessel 107d may be substantially filled with a solid/gas mixture and gas/liquid mixture, the pressure is relatively greater than the pressure in settling vessel 107b. In order to transfer the gas/liquid mixture from settling vessel 107d, cross-tie valve 113bd may be opened. Because of the pressure differential, the gas and/or gas/liquid mixture in higher pressure settling vessel 107d will flow to lower pressure settling vessel 107b. When pressure equalization occurs, a significant portion of the residual gas or gas/liquid will be evacuated from settling vessel 107d to settling vessel 107b. After equalization there may be more gas in the empty tanks than in the solid filled tanks because of the displacement effect of the solid particles. Upon the equalization of pressure, or according to additional parameters as determined by the requirements of a certain discharge system, crosstie valve 113bd may be closed. When crosstie valve 113bd is closed, settling vessels 107b and 107d are reisolated. Thus, as primary exit valve 110d is opened, and the solids are removed from discharge system 101, there is a minimum amount of gas lost from the system.

As may be seen from the above described discharge system, each settling vessel 107a-d in discharge system 101 may be in a different phase at any given time. The more overlap between the phases of operation, the faster the discharge valve cycle time. As such, in certain embodiments, it is foreseeable that each settling vessel 107a-d may be in a phase of operation corresponding to a specific phase of operation of at least one of the other settling vessels in the discharge system.

Figure 3:
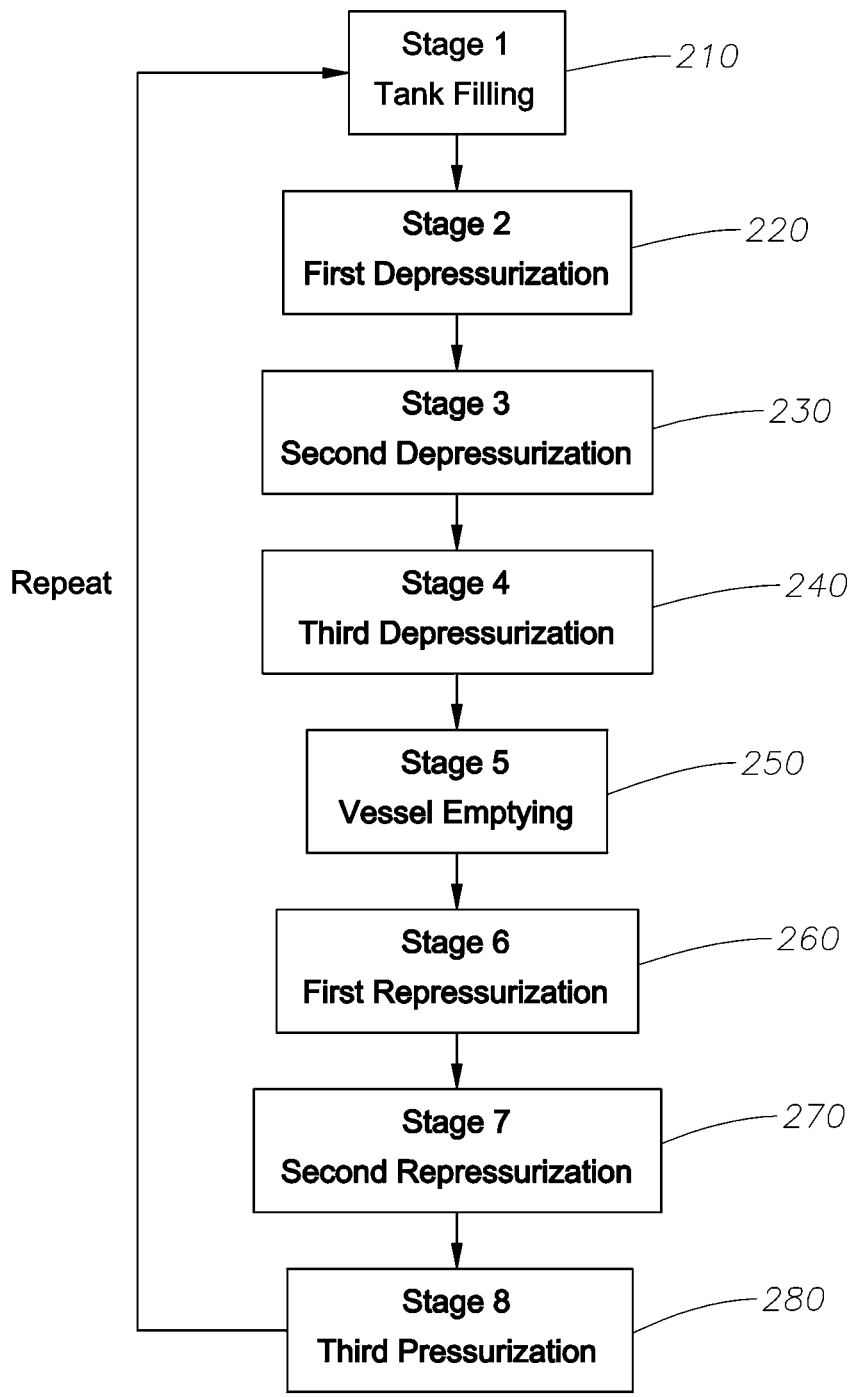
FIG. 3 is a block diagram of an embodiment of a discharge system in accordance with the present disclosure.

Still referring to FIG. 2, but also referring to FIG. 3, an order of operation for a discharge system in accordance with an embodiment of the present invention is shown. In a four vessel discharge system, as illustrated in FIG. 2, the operating sequence of the settling vessels 107a-d may alternate sequentially between any one of eight steps. While the embodiment described below provides eight steps of operation, it should be realized that according to the requirements of a given discharge system, some discharge systems will have less than eight steps of operation, while other discharge systems will have more than eight steps of operation.

Generally, FIG. 3 describes the steps of operation that a single vessel may potentially undergo during one cycle. These steps apply to each train in the discharge system. Each settling vessel 107a-d, in one cycle, will under go filling 210, a first depressurizing 220, a second depressurizing 230, a third depressurizing 240, emptying 250, a first repressurizing 260, a second repressurizing 270, and a third repressurizing 280.

In certain embodiments, a blow-off line (not shown) connecting vent line 109a-d to a flare or an additional pressure vessel may be used to maintain pressure stability in the discharge system. This blow-off line may be beneficial to bleed-off some of the pressure from the settling vessels 107a-d before a primary exit valve 110a-d is opened. In certain embodiments, the blow-off line may also be used to remove pressure from the settling vessel 107a-d prior to maintenance. Thus, in certain embodiments, gas may be transferred from the a first settling vessel 107a to, for example, a gas recovery system (not shown), or any other component such that the pressure of discharge system 101 is maintained according to the requirements of a given operation.

Now referring to the steps of FIG. 3 and the embodiments of FIG. 2, the steps are described in reference to a single train. Initially, during the tank filling step 210, primary discharge valve 108a and primary vent valve 111a may be opened, and a solid/gas mixture may flow into a first settling vessel 107a, as described above. After the completion of filling step 210, Primary discharge valve 108a and primary vent valve 111a are closed, and the first settling vessel 107a enters into a first depressurizing step 220. During the first depressurizing step 220, the pressure in the settling vessel 107a is equalized by opening a crosstie valve 113ab connecting the first settling vessel 107a and the second settling vessel 107b. Gas will flow from the higher pressure of the first settling vessel 107a to the lower pressure of the second settling vessel 107b. Upon equalization, the second settling vessel 107b may contain more gas because it is empty of solids, and the first settling vessel 107a may have a portion of its gas capacity displaced by the solids contained therein. In certain embodiments, as the first settling vessel 107a and the second settling vessel 107b are in first depressurizing step 220, pressure equalization may occur between a fourth settling vessel 107d that is solid full and a third settling vessel 107c that is empty.

During a second depressurizing step 230, which occurs after the first depressurizing step, the pressure in the first settling vessel 107a is equalized by opening a crosstie valve 113ac connecting the first settling vessel 107a and the third settling vessel 107c. To create a closed discharge system in the third settling vessel 107c, primary exit valve 110c has been closed, thereby allowing an equalization of the pressure between settling vessels 107a and 107c. Thus, gas may move from a higher starting pressure, granular solid-filled vessel, to a lower starting pressure vessel with no solids. In certain embodiments, contemporaneous to pressure equalization between settling first vessel 107a and the third settling vessel 107c, the second settling vessel 107b may be filled from fluidized bed pressure vessel 102, and the fourth settling vessel 107d may be emptied.

During a third depressurizing step 240, which occurs after the first depressurizing step, the pressure in first settling vessel 107a is equalized by opening crosstie valve 113ad connecting first settling vessel 107a and the fourth settling vessel 107d, after the fourth settling vessel 107d has been emptied. Pressure may thereby be equalized as described above. At least partially contemporaneous to pressure equalization between settling vessels 107a and 107d, granular solid-full settling vessels 107b and empty settling vessel 107c may undergo pressure equalization.

In the emptying step 250, which occurs after the third depressurizing step, the emptying of at least first settling vessel 107a may occur. By the emptying step 250, the pressure in the first settling vessel 107a has been reduced in three equalization steps, as described above, to a level lower than that in the fluidized bed pressure vessel 102. Volatile materials absorbed in the solids may have flashed as the pressure was reduced in each step. As such, the product of the flash may have been recovered to other settling vessels 107a-d as transferred gas. Thus, the first settling vessel 107a may be emptied of solids with minimal removal of gas or liquid from the discharge system 101. Contemporaneous with the emptying of the first settling vessel 107a, the third settling vessel 107c may be filled from the fluidized bed pressure vessel 102 and the second settling vessel 107b may be equalized with the fourth settling vessel 107d.

In a first repressurizing step 260, the first settling vessel 107a may undergo pressure equalization with the second settling vessel 107b by opening the crosstie valve 113ab. During the first repressurizing 260, the first settling vessel 107a may be empty and the fourth settling vessel 107b may be granular solid full and at a relatively low pressure. Thus, while the first settling vessel 107a is in the first repressurizing step 260, the fourth settling vessel 107b may be in the third depressurizing step 240. In certain embodiments, while the first settling vessel 107a is repressurized from the second settling vessel 107b, the third settling vessel 107c, which is granular full, may be pressure equalized from the fourth settling vessel 107d, which is empty.

In a second repressurizing step 270, the first settling vessel 107a may undergo pressure equalization with the third settling vessel 107c by opening the crosstie valve 113ac. During the second repressurizing 270, the first settling vessel 107a may be empty and the second settling vessel 107b may be granular solid-full, and at an intermediate pressure relative to the other settling vessels 107a, c, d. Thus, while the first settling vessel 107a is in the second repressurizing step 270, the third settling vessel 107c may be in the second depressurizing step 230. In certain embodiments, while the first settling vessel 107a is repressurized with the third settling vessel 107c, the fourth settling vessel 107d may be filled from fluidized bed pressure vessel 102 while the second settling vessel 107b is emptied.

In a third repressurizing step 280, the first settling vessel 107a may undergo pressure equalization with the fourth settling vessel 107d by opening the crosstie valve 113ad. During the third repressurizing step 280, the first settling vessel 107a may be empty and the fourth settling vessel 107d may be granular solid-full and at a relatively high pressure. Thus, while the first settling vessel 107a is in the third repressurizing step 280, the fourth settling vessel 107d is in the first depressurizing step 210. In certain embodiments, while the first settling vessel 107a is repressurized with the fourth settling vessel 107d, the third settling vessel 107c, granular solid-full, may be pressure equalized with the fourth settling vessel 107d, which is empty.

In the above described embodiment of the present disclosure, upon the completion of steps 210 through 280, the process may repeat. Thus, as shown, the primary valve 111a and primary discharge valve 108a may then be opened and gas in the first settling vessel 107a will be pushed back into the fluidized bed pressure vessel 102.

While the embodiment as described relates to a discharge system involving four settling vessels 107a-d, any number of settling vessels 107a-d including discharge systems with as few as two, and discharge systems with more than four settling vessels 107a-d may be foreseen. Additionally, the steps of vessel filling, depressurizing, emptying, and repressurizing should be viewed as one illustrative method of practicing the disclosed discharge system. Alternate methods of practice, as would be obvious to one of ordinary skill in the art may be foreseen, wherein, for example, the order of operations are reversed, modified, additional operations are added, or the discharge system is otherwise expanded.

Still referring to FIG. 4, but also referring to FIG. 3, an order of operation for a discharge system in accordance with an embodiment of the present invention is shown. In a four vessel discharge system, as illustrated in FIG. 4, the operating sequence of settling vessels 307a-d may alternate sequentially between any one of eight steps.

Now referring to the steps of FIG. 3 and the embodiments of FIG. 4, the process will be described in reference to a single train. Any other train will perform the same steps in the same, but coordinated sequence. Initially, during the tank filling step 210, a primary discharge valve 308a may be opened, along with a first secondary discharge valve 316a, and a solid/gas mixture may flow into the first settling vessel 307a, as described above. After the completion of filling step 210, the first settling vessel 307a enters into a the first depressurizing step 220. During the first depressurizing step 220, the pressure in the first settling vessel 307a is equalized with a second settling vessel 307b by opening a first multi-port valve 318ab fluidly connecting the first settling vessel 307a and the second settling vessel 307b (occurring after the filling step as illustrated in FIG. 3). Gas may flow from the higher pressure of the first settling vessel 307a to the lower pressure of the second settling vessel 307b. Upon equalization, the second settling vessel 307b may contain more gas because it is empty of solids, and the first settling vessel 307a may have a portion of its gas capacity displaced by the solids contained therein. In certain embodiments, pressure equalization may occur between solid-full fourth settling vessel 307d and emptied third settling vessel 307c at least partially concurrently with the first depressurizing step 220 by closing a third primary exit valve 310c and aligning a second multi-port valve 318cd to allow the flow of gasses there between.

In an alternate embodiment of the above step, the first multi-port valve 318ab may remain closed during the first depressurizing step, thereby isolating the first settling vessel 307a and the second settling vessel 307b from the rest of discharge system 301. Subsequently, a first secondary vent valve 314a and a second secondary vent valve 314b may be opened to allow the flow of gas between the first settling vessel 307a and the second settling vessel 307b.

During the second depressurizing step 230, the pressure in the first settling vessel 307a is equalized with the third settling vessel 307c by aligning the first multi-port valve 318ab and the second multi-port valve 318cd to fluidly connect the first settling vessel 307a and the third settling vessel 307c (occurring at a time after the first depressurizing step as illustrated in FIG. 3). To create a closed discharge system in the third settling vessel 307c, third primary exit valve 310c has been closed, thereby allowing an equalization of the pressure between the first settling vessels 307a and the third settling vessel 307c. In certain embodiments, second settling vessel 307b may be filled from fluidized bed pressure vessel 302, and fourth settling vessel 307d may be emptied at least partially concurrently with the second depressurizing step 230.

During the third depressurizing step 240, the pressure in the first settling vessel 307a is equalized with the fourth settling vessel 307d by aligning the first multi-port valve 318ab and the second multi-port valve 318cd to fluidly connect the first settling vessel 307a and the fourth settling vessel 307d (occurring at a time after the second depressurizing step as illustrated in FIG. 3). In certain embodiments, the second settling vessel 307b, which is granular solid-full, may be equalizing with empty third settling vessel 307c at least partially concurrently with the third depressurizing step 240.

In the emptying step 250, the emptying of the first settling vessel 307a may occur. The emptying step comprises opening the primary exit valve 310 and transferring the solids and any remaining gases to downstream equipment (not shown) through the first conveying line 115a. By the emptying step 250, the pressure in the first settling vessel 307a has been reduced in three equalization steps, as described above, to a level lower than that in the fluidized bed pressure vessel 302. In certain embodiments, the third settling vessel 307c may be filling from the fluidized bed pressure vessel 302 and the second settling vessel 307b may be equalizing with the fourth settling vessel 307d at least partially concurrently with the emptying step 250.

In the first repressurizing step 260, the first settling vessel 307a may undergo pressure equalization with the second settling vessel 307b by aligning the first multi-port valve 318ab to fluidly connect the two settling vessels. During the first repressurizing 260, the first settling vessel 307a may be empty and the fourth settling vessel 307b may be granular solid full and at a relatively low pressure. Thus, while the first settling vessel 307a is in the first repressurizing step 260, the second settling vessel 307b may be in its third depressurizing step 240. In certain embodiments, the third settling vessel 307c, which may be granular solid-full, may be pressure equalized with the fourth settling vessel 307d, which is empty, at least partially concurrently with the first repressurizing step 260.

In the second repressurizing step 270, the first settling vessel 307a may undergo pressure equalization with the third settling vessel 307c, by aligning the first multi-port valve 318ab and the second multi-port valve 318cd to allow the flow of gas there between. During the second repressurizing 270, first settling vessel 307a may be empty and the third settling vessel 307c may be granular solid-full. Thus, while first settling vessel 307a is in the second repressurizing step 270, the third settling vessel 307c may be in the second depressurizing step 230. In certain embodiments, the fourth settling vessel 307d may be filled from the fluidized bed pressure vessel 302, and the second settling vessel 307b may be in the emptying step 250 at least partially concurrently with the second repressurizing step 270.

In the third repressurizing step 280, the first settling vessel 307a may undergo pressure equalization with the fourth settling vessel 307d by aligning the first multi-port valve 318ab and the second multi-port valve 318cd such as to allow the flow of gas there between. During the third repressurizing step 280, the first settling vessel 307a may be empty, and the fourth settling vessel 307d may be granular solid-full and at a relatively high pressure. Thus, while the first settling vessel 307a is in the third repressurizing step 280, the fourth settling vessel 307d is in the first depressurizing step 210. In certain embodiments, granular solid full third settling vessel 307c may be pressure equalizing with empty fourth settling vessel 307d at least partially concurrently with the third repressurizing step 280.

In the above described embodiment of the present disclosure, upon the completion of the above steps 210 through 280, the process may repeat. Additionally, the steps of vessel filling, depressurizing, emptying, and repressurizing should be viewed as an illustrative method of practicing the disclosed discharge system. Alternate methods of practice, as would be obvious to one of ordinary skill in the art may be foreseen, wherein, for example, the order of operations are reversed, modified, additional operations are added, or the discharge system is otherwise expanded.

Referring back to FIG. 2, to provide the safety benefit of preventing high pressure gas from passing from the fluidized bed pressure vessel 107a-d to lower pressure rated equipment, in one embodiment of the method, there is logic in place to assure that there is always at least two valves closed between the fluidized bed pressure vessel 107a-d and a downstream vessel. As used herein, the downstream vessel may be any vessel that is downstream of any particular settling vessel. In this embodiment, a secondary exit valve 119a-d, as described herein above, is installed in the conveying line of the settling vessel.

Figure 5A:
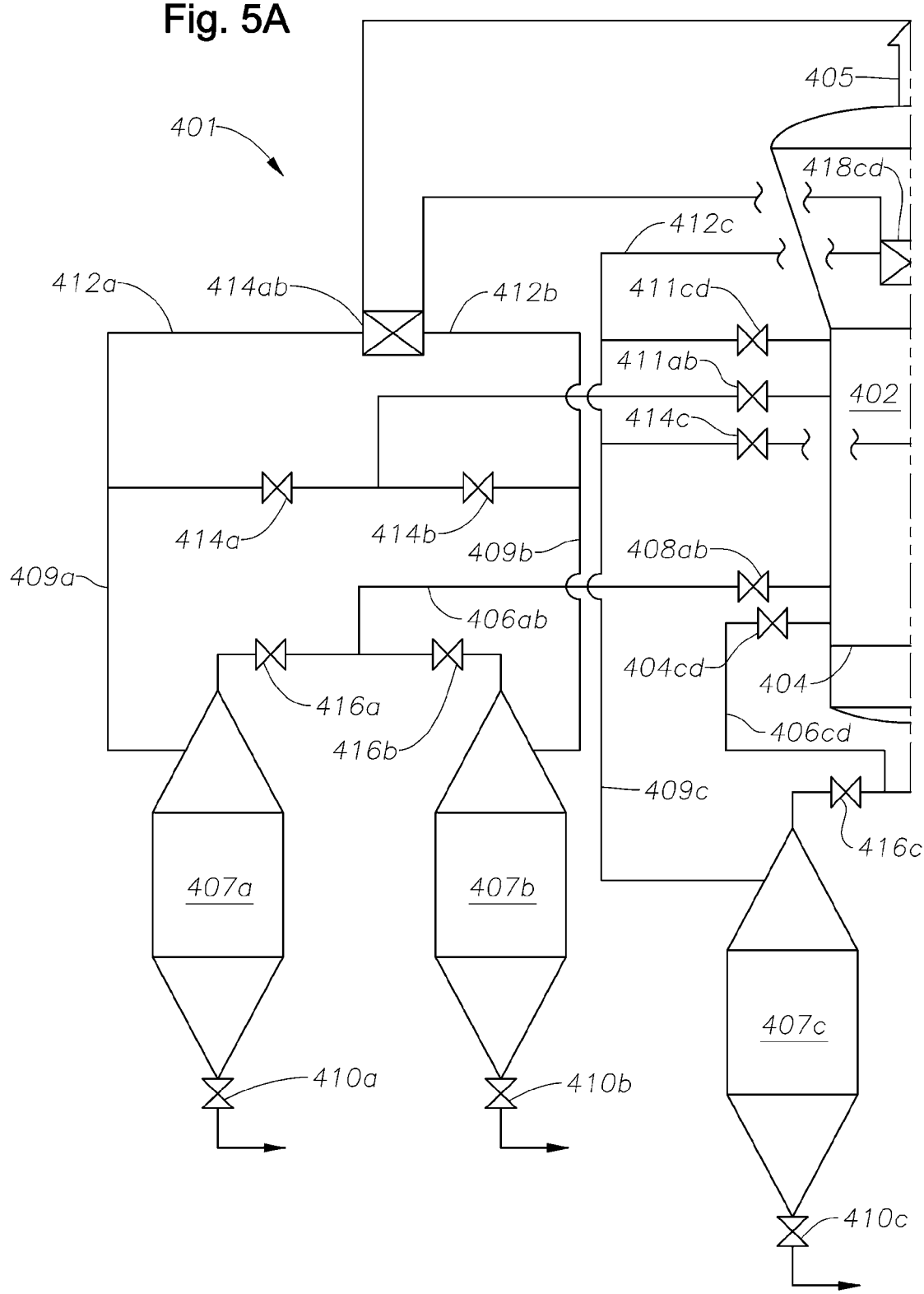
FIGS. 5A and 5B are schematic drawings of yet another embodiment of a discharge system in accordance with the present disclosure.
Figure 5B:
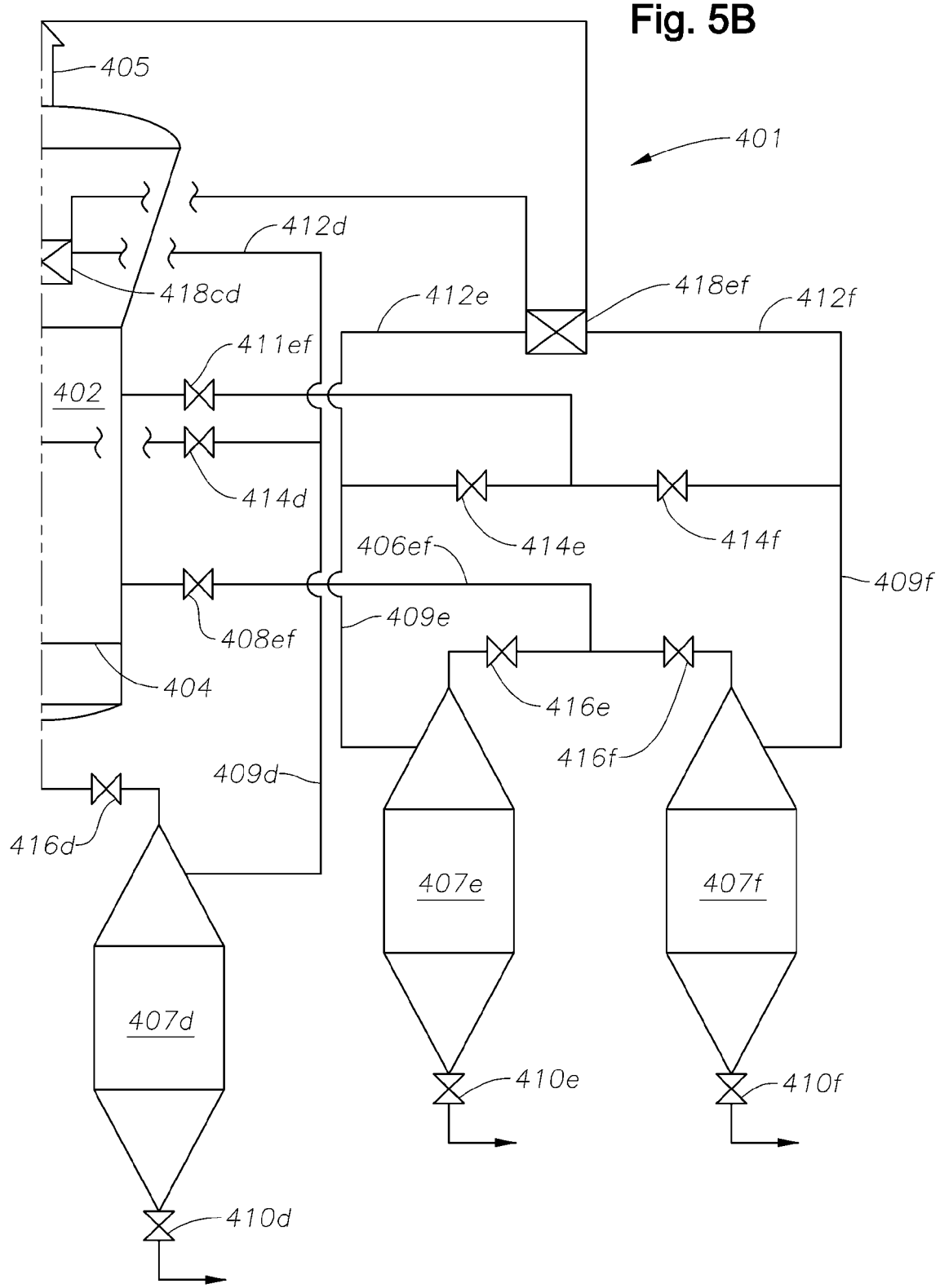

Referring now to FIG. 5, a schematic drawing of an alternate discharge system in accordance with an embodiment of the present disclosure is shown. In this embodiment, the plurality of settling vessels 407a-f comprises six settling vessel 407a-f that are connected to the fluidized bed pressure vessel 402 via a plurality of common discharge lines 406ab, cd, ef. The flow of solids from the fluidized bed pressure vessel 402 and the plurality of settling vessels 407a-f is controlled by a plurality of primary discharge valves 408ab, cd, ef. The plurality of settling vessels 407a-f also each have a primary exit valve 410a-f, to control the flow of solids between the settling vessels 407a-f and downstream processing equipment (not shown).

Still referring to FIG. 5, in the alternate discharge system 401, the connections between the fluidized bed pressure vessel 402 and the plurality of settling vessels 407a-f have been reduced relative to the embodiment disclosed in FIG. 2. Specifically, groups of settling vessels 407a-f share the plurality of common discharge lines 406ab, cd, ef and associated primary discharge valves 408ab, cd, ef. The grouping of the plurality of settling vessels 407a-f decreases the amount of connections required to transfer solids from the fluidized bed pressure vessel 402. Additionally, a plurality of secondary discharge valves 416a-f control the flow of solids between fluidized bed pressure vessel 402 and the six settling vessels 407a-f.

Alternate discharge system 401 may also allow reduction in the amount of connections necessary to transfer gases between fluidized bed pressure vessel 402 and settling vessels 407a-f. In one embodiment, discharge system 401 may tie vent lines 409a-f together with common primary vent valves 411ab, cd, ef.

In other embodiments shown in FIG. 5, to reduce the amount of connections necessary to transfer gas between pressurized individual settling vessels 407a-f, discharge system 401 uses multi-port valves 418ab, cd, ef. Multi-port valves 418ab, cd, ef may function similar to multi-port valves 318ab, cd of discharge system 301, however, it should be noted that in discharge system 401, a first multi-port valve 418ab connects a pair of settling vessels 407ab to a second multi-port valve 418cd and a third multi-port valve 418ef, thereby connecting each of the plurality of settling vessels 407a-f. As illustrated, the use of multi-port valves 418ab, cd, ef may allow for simplified connections and smaller, more cost efficient connecting lines and associated valves, such as to reduce both the initial cost and maintenance of the discharge system.

In certain embodiments, it may be beneficial to further modify the discharge system 401 by connecting each of the settling vessels 407a-f to the fluidized bed pressure vessel 402, adding additional multi-port valves 418ab, cd, ef, further sharing of the vent lines 409a-f, or by grouping the settling vessels 407a-f into sets of three, four, or any additional number of tanks per set that may enhance operating efficiency. Particularly, because the settling vessels 407a-f may share the discharge lines 406ab, cd, ef and the primary discharge valves 408ab, cd, ef and/or the secondary discharge valves 416a-f, the present discharge system may be retrofitted into existing discharge systems for pressurized solid separation. The retrofitting capabilities of the above described method may thereby allow existing discharge systems to become more efficient when operating in accordance with the present disclosure.

Still referring to FIG. 5, an order of operation for a six vessel discharge system, may include settling vessels 407a-f sequentially operating between any one of ten steps. Initially, the operating steps of a six vessel discharge system will include the eight steps illustrated in FIG. 3 and described above. However, as the number of settling vessels 407a-f increase, additional pressure equalization steps, namely depressurizing and repressurizing, may be added to further increase the efficiency of the discharge system. Thus, in a six vessel discharge system, in at least one embodiment, each settling vessel may undergo a filling, a first depressurizing, a second depressurizing, a third depressurizing, a fourth depressurizing, a fifth depressurizing, an emptying, a first repressurizing, a second repressurizing, a third repressurizing, a fourth repressurizing, and a fifth repressurizing, before repeating. One of ordinary skill in the art will realize that every additional vessel may add one additional depressurizing, and one additional repressurizing step.

One of ordinary skill in the art may realize that as the number of depressurizing and repressurizing steps for each tank increases, the efficiency of the discharge system may increase. For example, by adding additional depressurizing and repressurizing steps, as may occur in discharge system 401, the potential for increased gas and gas/liquid discharge prior to emptying increases. As such, the discharge system may result in greater gas recovery and less raw material loss. Additionally, it should be realized that in certain embodiments, the maximum number of simultaneous equalizations may be one half the number of settling vessels 407a-f. For example, in a six vessel discharge system, three simultaneous equalizations may occur, or two simultaneous equalizations (involving four of the vessels) while a fifth vessel is filling and a sixth vessel is emptying. Thus, in certain embodiments, it may be necessary to add additional equalization/vent lines, or otherwise connect the settling vessels through more valves such that the equalizations may occur in the most efficient manner.

One of skill in the art will also recognize that discharge system gas efficiency is improved by minimizing the valved-in volume of the discharge system that is not filled with a solid after the filling step. As used herein, the valved-in volume refers to the combined volume of the settling vessel and the associated piping fluidly connected to the settling vessel up to the first closed automatic valve.

Referring back to FIG. 4, the valved-in volume not filled with a solid after the filling step may be minimized by providing a secondary discharge valve 316a-d as described above and adding a step of clean-gas purging the discharge piping. The step of clean-gas purging the discharge piping comprises the steps of: closing the primary discharge valve 308a, b, and the primary vent valve 311a, d after the filling step; pausing a short time to allow resin entrained in the vent line 309a-d and the discharge line 306ab, cd to settle back into the settling vessel 307a-d after the filling step; closing the secondary discharge valve 316a-d and the secondary vent valve 314a-d after the pausing step; and opening the primary discharge valve 308a, b, the primary vent valve 311a, d, a clean-gas purge valve 322a (shown in two places), and a vent line purge valve 324a, d after closing the secondary discharge valve 316a-d to allow the purging gas to sweep the discharge line 306ab, cd and the common vent line 326ab, cd to clear of any residual solid particles from the lines. As used herein, pausing a short time means pausing a period of time from about 1 second to about 1 minute, more preferably from about 1 to about 15 seconds, and even more preferably from about 1 to about 5 seconds. These valves may be left open, or preferably closed when the line purging is complete in order to minimize the use of the purging gas. In some preferred embodiments, each settling vessel 307a-d will have a vent line purge 323a, d, and vent line purge valve 324a, d, whereas in other embodiments, at least two settling vessels will have a single vent line purge 323a, d, and vent line purge valve 324a, d.

Using the methods and devices described herein, a product discharge system that provides improved gas efficiency may be provided. In one embodiment of the invention, a method of discharging solid particles from a fluidized bed pressure vessel is provided comprising the steps of: providing a discharge system comprising a settling vessel, wherein the discharge system is absent a transfer tank, and wherein the settling vessel is absent a filter element; and filling the settling vessel with solid particles discharged from a fluidized bed pressure vessel, wherein a volume of discharged solid particles filling the settling vessel is at least 95% of an actual volume of the settling vessel, preferably the volume of discharged solid particles is at least 98% of the actual volume of the settling vessel, and even more preferably the volume of discharged solid particles is at least 100% of the actual volume of the settling vessel. In another embodiment of this method, the volume of discharged solid particles is greater that about 90% of a valved-in volume, and preferably the volume of discharged solid particles is greater than about 100% of the valved-in volume.

Figure 1:
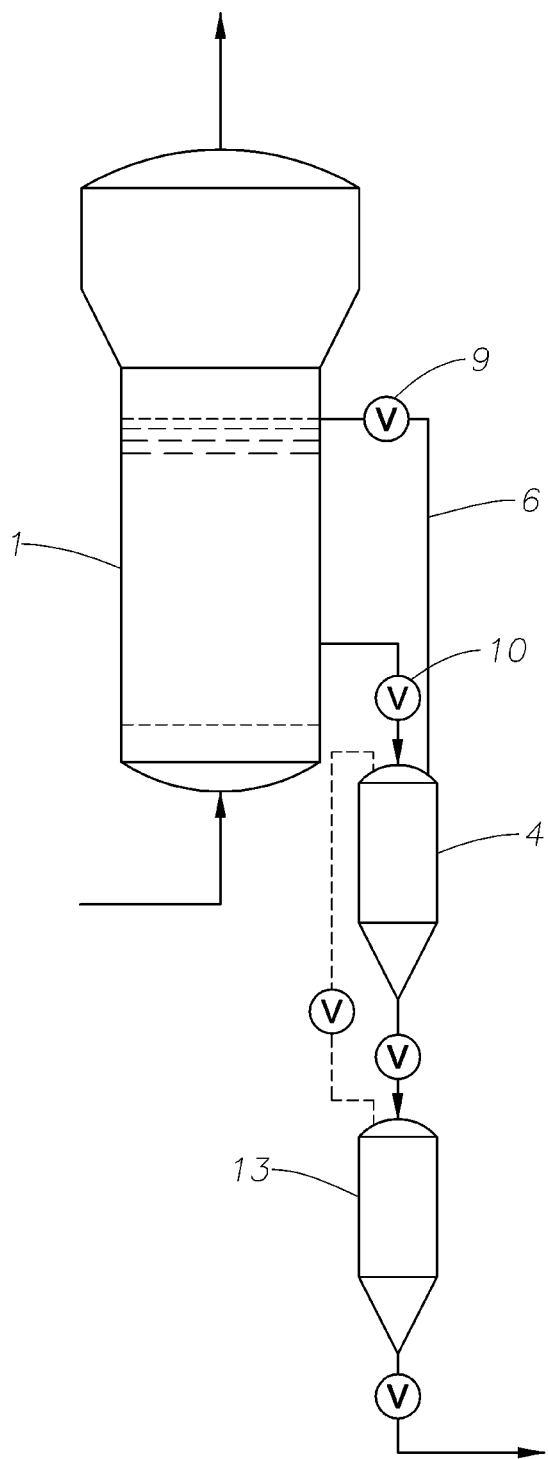
FIG. 1 is a reproduced schematic drawing of the prior art discharge system described in U.S. Pat. No. 4,621,952.

As will be understood by one of ordinary skill in the art, embodiments of the present disclosure may be used to retrofit existing discharge systems. Generally, the discharge system of FIG. 1 may be modified in accordance with the present discharge system as disclosed in FIG. 2. Specifically, referring to FIG. 1, a transfer vessel 13 may be removed from the discharge system, and a settling vessel 4 may be connected directly to downstream equipment. Additionally, the transfer tank 13 may then be connected to fluidized bed pressure vessel 1 and reconfigured as an alternate settling tank. The alternate settling tank may then be crosstied together with the original settling tank such that gas may travel between the settling tanks. Thus, the transfer tanks 13 and settling vessels 4 of FIG. 1 may become the settling vessels described in the present disclosure. This method of retrofitting existing discharge systems may be beneficial in reducing cost or reconditioned older discharge systems for more efficient use.

While described relative to an embodiment of the present disclosure described in FIG. 2, one of ordinary skill in the art will realize that any discharge system or method in accordance with the present disclosure may be retrofitted onto an existing discharge system for removing solids from a pressure vessel. For example, in alternate embodiments, the discharge systems and methods disclosed in FIGS. 3 and 4 may be applied to an existing discharge system by modifying the existing discharge system to include multi-port valves, as discussed above.

Advantageously, embodiments of the present disclosure may allow greater flexibility in physical design. Specifically, because the discharge system does not require a series vessels, the height of the fluidized bed pressure vessel may be reduced. Further, by decreasing the height requirement of the pressure vessel, settling vessel size may be varied and settling vessels may share discharge lines, vent lines, and conveying lines. Additionally, settling vessels run in parallel may allow the reduction of piping and valve cost. Also, when maintenance does occur, the processing efficiency may not be as affected as prior art systems because there may be more settling vessels present, and removing one settling vessel will have a smaller effect on the processes of the other vessels in the discharge system.

Further, in embodiments where greater solids removal capacity is desirable, embodiments of the present discharge system may be run with more than one vessel simultaneously filling while more than one vessel are simultaneously discharging. In such an embodiment, the gas recovery efficiency may be reduced by decreasing the number of equalization steps for the advantage of increasing the solids removal rate. For example, a six vessel discharge system may be operated as two separate, three vessel discharge systems, wherein there may be two depressurizing steps, and two repressurizing steps. Because the number of steps is decreased, such an embodiment may provide a greater solids removal capacity compared to the operation of the single six vessel discharge system, as described above.

Additional advantages may be realized by increasing the frequency of product drops from the settling vessels. Specifically, tank size may be varied to allow the optimal product drop intervals without risking loss of recyclable material. Further, smaller valves and piping may be used in discharge systems with more tanks, thereby decreasing initial discharge system, as well as costs for maintenance and replacement.

Additionally, because of the additional pressure equalization steps, embodiments of the current discharge system may provide a decrease in the loss of gas and gas/liquid mixture from the discharge system. In certain embodiments, the discharge system may be efficient enough so as to remove post discharge gas recovery/recycling systems used in current discharge systems.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All priority documents are herein fully incorporated by reference for all jurisdictions in which such incorporation is permitted and to the extent such disclosure is consistent with the description of the present invention. Further, all documents and references cited herein, including testing procedures, publications, patents, journal articles, etc. are herein fully incorporated by reference for all jurisdictions in which such incorporation is permitted and to the extent such disclosure is consistent with the description of the present invention.

While the invention has been described with respect to a number of embodiments and examples, those skilled in the art, having benefit of this disclosure, will appreciate that other embodiments can be devised which do not depart from the scope and spirit of the invention as disclosed herein.

What is claimed is:

1. A discharge system for removing solids from a fluidized bed pressure vessel, the discharge system comprising:
    (a) four settling vessels arranged in parallel;
    (b) a discharge line fluidly connecting a fluidized bed pressure vessel to at least one of the settling vessels;
    (c) a primary discharge valve to control a discharge flow of a fluid mixture to the at least one of the settling vessels, wherein at least two settling vessels are fluidly connected to the fluidized bed pressure vessel through a single common discharge line and a single common primary discharge valve;
    (d) a vent line fluidly connecting the fluidized bed pressure vessel and at least one of the settling vessels;
    (e) a primary vent valve to control a vent flow through the vent line, wherein at least two settling vessels are fluidly connected to the fluidized bed pressure vessel through a single common vent line and a single common primary vent valve;
    (f) a secondary vent valve in series with the primary vent valve between the fluidized bed pressure vessel and at least one settling vessel;
    (g) four crosstie lines, wherein at least one crosstie line fluidly connects at least two of the settling vessels;
    (h) at least one crosstie valve to control a crosstie flow through the crosstie line; and
    (i) a primary exit valve to control an exit flow of the fluid mixture exiting at least one of the settling vessels,
wherein the discharge system is absent a transfer tank, and wherein the plurality of settling vessels are absent a filter element; and
wherein the discharge system comprises a first set of crosstie lines comprising a first and a second of the four crosstie lines, a second set of crosstie lines comprising a third and a fourth of the four crosstie lines, and at least two multi-port valves, wherein the at least two multi-port valves fluidly connect the first set of crosstie lines to the second set of crosstie lines.

2. The discharge system of claim 1, wherein at least one of the settling vessels further comprises a conical top head.

3. The discharge system of claim 1, further comprising a solids monitoring device connected to at least one of the settling vessels.

4. The discharge system of claim 1, further comprising a plurality of secondary discharge valves in series with the primary discharge valve, wherein the primary discharge valve and at least one of the plurality of secondary discharge valves are located between the fluidized bed pressure vessel and at least one of the settling vessels, and wherein both the primary discharge valve and the at least one of the plurality of secondary discharge valves control the discharge flow to the settling vessel.

5. The discharge system of claim 1, further comprising a secondary exit valve, wherein both the primary exit valve and the secondary exit valve control the exit flow from at least one of the settling vessels.

6. The discharge system of claim 1, further comprising a dry-gas purge fed to at least one of the settling vessels.

7. The discharge system of claim 1, further comprising a clean-gas purge fed to the discharge line.

8. The discharge system of claim 1, wherein the crosstie valve is a flow-controlling type valve.

9. A method for removing a solid from a fluidized bed pressure vessel using the discharge system of claim 1, said method comprising
    (a) filling a first settling vessel with a mixture from the fluidized bed pressure vessel, wherein said mixture comprises a solid and a pressurized gas;
    (b) equalizing the first settling vessel with at least a second settling vessel, wherein the pressurized gas is transferred between the first settling vessel and the second settling vessel; and
    (c) emptying the first settling vessel.

10. The method of claim 9, wherein the equalizing comprises repressurization of at least one of the settling vessels.

11. The method of claim 9, wherein the equalizing comprises depressurization of at least one of the settling vessels.

12. The method of claim 9, further comprising recycling the pressurized gas transferred between at least one of the settling vessels and the fluidized bed pressure vessel.

13. The method of claim 9, wherein the equalizing step comprises repressurization and depressurization of at least two of the settling vessels.

14. The method of claim 9, further comprising equalizing at least one of the settling vessels with at least two of the settling vessels.

15. The method of claim 9, further comprising the steps of:
    (a) providing at least four settling vessels;
    (b) first depressurizing the first settling vessel by transferring a first portion of the pressurized gas from the first settling vessel to the second settling vessel after the filling step;
    (c) second depressurizing the first settling vessel by transferring a second portion of the pressurized gas from the first settling vessel to a third settling vessel after the first depressurizing step;
    (d) emptying the solid out of the first settling vessel after the second depressurizing step;

(e) first repressurizing the first settling vessel by transferring a first return portion of the pressurized gas from the second settling vessel to the first settling vessel after the emptying step; and (f) second repressurizing the first settling vessel by transferring a second return portion of the pressurized gas from the third settling vessel to the first settling vessel after the first repressurizing step.

16. The method claim 15, further comprising the steps of:

(a) third depressurizing the first settling vessel by transferring a third portion of the pressurized gas from the first settling vessel to the fourth settling vessel after the second depressurizing step and before the emptying step; and (b) third repressurizing the first settling vessel by transferring a third return portion of the pressurized gas from the fourth settling vessel to the first settling vessel after the second repressurizing step.

17. The method of claim 16, further comprising the steps of:

(a) transferring the pressurized gas from the fourth settling vessel to the third settling vessel at least partially concurrently with the first depressurizing step; and (b) filling the second settling vessel with the mixture from the fluidized bed pressure vessel at least partially concurrently with the second depressurizing step.

18. The method of claim 17, further comprising the steps of:

(a) emptying the solid out of the fourth settling vessel at least partially concurrently with the second depressurizing step; and (b) transferring the pressurized gas from the second settling vessel to the third settling vessel at least partially concurrently with the third depressurizing step.

19. The method of claim 18, further comprising the steps of:

(a) filling the third settling vessel with the mixture from the fluidized bed pressure vessel at least partially concurrently with emptying the first settling vessel;

(b) filling the fourth settling vessel with the mixture from the fluidized bed pressure vessel at least partially concurrently with the second repressurizing step; and (c) transferring the solid out of the second settling vessel at least partially concurrently with the second repressurizing step.

20. The method of claim 19, further comprising the steps of:

(a) transferring the pressurized gas from the third settling vessel to the fourth settling vessel at least partially concurrently with the first repressurizing step; and (b) transferring the pressurized gas from the third settling vessel to the second settling vessel at least partially concurrently with the third repressurizing step.

21. The method of claim 9, wherein there are always at least two valves closed between the fluidized bed pressure vessel and a downstream vessel, wherein the downstream vessel is downstream of at least one of the settling vessels.

22. The method of claim 9, further comprising the step of clean-gas purging a discharge line.

23. The method of claim 9, further comprising the step of clean-gas purging a vent line.

24. The method of claim 9, further comprising the step of dry-gas purging at least one of the settling vessels.

25. The method of claim 9, wherein a volume of discharged solid particles filling the first of the settling vessels is at least 95% of an actual volume of the first of the settling vessels or is greater that about 90% of a valved-in volume of the first of the settling vessels.

* * * * *